United States Patent
Hyde et al.

(10) Patent No.: US 8,058,609 B2
(45) Date of Patent: Nov. 15, 2011

(54) BEAM POWER WITH MULTIPOINT BROADCAST

(75) Inventors: Roderick A. Hyde, Redmond, WA (US); Muriel Y. Ishikawa, Livermore, CA (US); Jordin T. Kare, Seattle, WA (US); Thomas J. Nugent, Jr., Issaquah, WA (US); Thomas A. Weaver, San Mateo, CA (US); Lowell L. Wood, Jr., Bellevue, WA (US); Victoria Y. H. Wood, Livermore, CA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 446 days.

(21) Appl. No.: 12/286,737

(22) Filed: Sep. 30, 2008

(65) Prior Publication Data
US 2010/0079009 A1 Apr. 1, 2010

(51) Int. Cl.
*H02J 17/00* (2006.01)
(52) U.S. Cl. ............. 250/227.26; 250/201.1; 455/343.1; 455/127.1
(58) Field of Classification Search ............. 250/227.26, 250/205, 206, 214 R, 214 PR; 342/457, 357.1, 342/357.12; 455/69, 522, 523, 70, 92
See application file for complete search history.

(56) References Cited

U.S. PATENT DOCUMENTS

| | | | |
|---|---|---|---|
| 3,971,454 A | 7/1976 | Waterbury | |
| 4,845,354 A | 7/1989 | Gupta et al. | |
| 5,260,639 A | 11/1993 | De Young et al. | |
| 5,982,139 A | 11/1999 | Parise | |
| 6,114,834 A | 9/2000 | Parise | |
| 6,407,535 B1 | 6/2002 | Friedman et al. | |
| 6,534,705 B2 | 3/2003 | Berrios et al. | |
| 6,633,026 B2 | 10/2003 | Tuominen | |
| 6,792,259 B1 | 9/2004 | Parise | |
| 6,967,462 B1 | 11/2005 | Landis | |
| 7,068,991 B2 | 6/2006 | Parise | |
| 7,844,306 B2 | 11/2010 | Shearer et al. | |
| 2003/0075670 A1 | 4/2003 | Tuominen | |
| 2004/0227057 A1 | 11/2004 | Tuominen et al. | |
| 2005/0185903 A1* | 8/2005 | Koertel | 385/101 |
| 2006/0266917 A1 | 11/2006 | Baldis et al. | |
| 2007/0007821 A1 | 1/2007 | Rossetti | |
| 2007/0019693 A1 | 1/2007 | Graham | |
| 2007/0021140 A1* | 1/2007 | Keyes et al. | 455/522 |
| 2008/0084596 A1 | 4/2008 | Graham | |

FOREIGN PATENT DOCUMENTS
WO WO 2008/063678 A1 5/2008

OTHER PUBLICATIONS

PCT International Search Report; International App. No. PCT/US 09/05419; bearing a date of Mar. 2, 2010; pp. 1-4.

\* cited by examiner

*Primary Examiner* — Seung C Sohn

(57) ABSTRACT

A beam power source transmits a signal indicating power availability, receives a request for power in response, and beams power in response to the request.

36 Claims, 13 Drawing Sheets

BEAM POWER WITH MULTIPOINT BROADCAST

CROSS-REFERENCE TO RELATED APPLICATIONS

Related Applications

The present application is related to U.S. patent application Ser. No. 12/286,737, titled BEAM POWER WITH MULTIPOINT BROADCAST, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

The present application is related to U.S. patent application Ser. No. 12/286,755, titled BEAM POWER WITH MULTIPOINT RECEPTION, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

The present application is related to U.S. patent application Ser. No. 12/286,735, titled BEAM POWER WITH BROADCASTER IMPINGEMENT DETECTION, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

The present application is related to U.S. patent application Ser. No. 12/286,744, titled BEAM POWER WITH RECEIVER IMPINGEMENT DETECTION, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

The present application is related to U.S. patent application Ser. No. 12/286,741, titled BEAM POWER WITH BEAM REDIRECTION, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

The present application is related to U.S. patent application Ser. No. 12/286,758, titled BEAM POWER WITH MULTIPLE POWER ZONES, naming Roderick A. Hyde, Muriel Y. Ishikawa, Jordin T. Kare, Thomas J. Nugent, Jr., Thomas A. Weaver, Lowell L. Wood, Jr., and Victoria Y. H. Wood as inventors, filed 30 Sep. 2008, which is currently co-pending.

SUMMARY

In one aspect, a power source configured to beam power to a receiving unit includes a location unit and a power beaming unit. The location unit is configured to locate a receiving unit in need of power by initiating contact with the receiving unit by broadcasting a signal indicative of its ability to supply power and by receiving a request for power from the receiving unit in response to the broadcast signal. The power beaming unit is configured to beam power to the receiving unit. Broadcasting may include initiating broadcasting according to a time schedule, or in response to a detected condition (e.g., detection of a person in the broadcast area). The power beaming unit may be configured to beam power within an enclosed space. The location unit may be configured to receive a request for power in the form of a transmission from the receiving unit or of a reflection of the broadcast signal from the receiving unit (e.g., a modulated reflection, which the power beaming unit may be configured to interpret). The request for power from the receiving unit may include location information for the receiving unit, for example encoded in a signal received from the receiving unit, determinable from a path of the received signal (e.g., by scanning, by imaging, or by directional antenna), or based on identifying information included in the received signal (e.g., by determining a previous location or by accessing a location database). The location unit may be configured to determine an attitude of the receiving unit. The location unit may be configured to broadcast or to receive an electromagnetic signal (e.g., optical or RF) or an acoustic signal. The location unit may be configured to receive a request for power including information describing power needs (e.g., power type, wavelength, pulse characteristics, power amount, energy amount, polarization, power-vs-time profile, time window, offset of aperture, aperture size or attitude, acceptable price, ability to pay, mode of payment, or identifying information for the receiving unit, in which case the location unit may be configured to determine additional information about power needs of the receiving unit on the basis of the identifying information). The power source may further include a decision unit configured to determine whether to beam power from the power beaming unit, which may further be configured to determine whether to initiate, suspend, or terminate power beaming. The decision unit may be configured to receive a signal confirming receipt or amount of power received, and may be configured to compare the amount of power received with the amount transmitted. The decision unit may be configured to accept power request information from the power receiving unit (e.g., requested power characteristic(s) or proposed payment terms) to determine whether to beam power from the power beaming unit. The location unit may be configured to transmit data to the receiving unit, for example by modulating the beamed power from the power beaming unit or via a separate channel. The transmitted data may include, for example, information for negotiating power delivery characteristic(s) or payment characteristic(s), identity authentication information for the receiving unit, or power receipt monitoring data. The power beaming unit may be configured to beam power directly to the receiving unit, or via a beam-directing element, and may be configured to gradually increase an amount of power beamed from the power beaming unit. The power beaming unit may be configured to beam electromagnetic power (e.g., optical or RF), and may include a laser. The power beam may be pulsed or continuous. The power source may further include an impingement detector configured to detect that the beamed power has encountered an obstruction, for example by detecting scattered or reflected radiation. The power beaming unit may be configured to suspend or terminate transmission upon detection that the beamed power has encountered an obstruction.

In another aspect, a power source configured to beam power to a receiving unit includes a location unit and a power beaming unit. The location unit is configured to locate a receiving unit in need of power by scanning a signal indicative of its ability to supply power and receiving a request for power from the receiving unit in response to the scanned signal. The request for power is in the form of a reflection of the scanned signal, which may optionally be modulated. The power beaming unit is configured to beam power to the receiving unit. The location unit may be configured to discontinue scanning upon receiving the request for power. The power beaming unit may be configured to beam power within an enclosed space. Scanning may include initiating scanning according to a time schedule or in response to a detected condition (e.g., detection of a person in a broadcast area). The location unit may be configured to receive a request for power in the form of a modulated reflection of the scanned signal from the receiving unit, and may be further configured to interpret the modulated reflection. The location unit may be configured to receive a request for power in the form of a reflection of the scanned signal and a further transmission from the receiving unit (e.g., an electromagnetic or acoustic transmission, or a transmission over a wired connection or over the internet). The request for power from the receiving unit may include location information for the receiving unit, for example encoded in a signal received from the receiving unit or determinable from a path of a signal received from the receiving unit. The location information for the receiving unit may include identifying information for the receiving unit, in which case the location unit may be configured to determine a location for the receiving unit on the basis of the identifying information. The location unit may be configured to determine a location for the receiving unit by determining a previous location for the unit or by accessing a location database. The location unit may be configured to determine an attitude of the receiving unit, and may broadcast an electromagnetic signal (e.g., optical or RF) or an acoustic signal. The location unit may configured to receive a request for power including information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit, in which case the location unit may be configured to determine additional information about power needs of the receiving unit on the basis of the identifying information). The power source may further comprise a decision unit configured to determine whether to beam power from the power beaming unit. The decision unit may be configured to accept power request information (e.g., a requested characteristic or proposed payment terms) from the power receiving unit to determine whether to beam power from the power beaming unit, and may be configured to determine whether to initiate, suspend, or terminate power beaming. The decision unit may be configured to receive a signal confirming receipt of received power or an amount of power received, and may further be configured to compare the amount of power received with an amount of power transmitted. The location unit may be configured to transmit data to the receiving unit, for example by modulating the beamed power from the power beaming unit or via a separate channel from the beamed power from the power beaming unit (e.g., for negotiating a power delivery characteristic or a payment characteristic, for authenticating identity of the receiving unit, or for monitoring receipt of power by the receiving unit). The power beaming unit may be configured to beam power directly to the receiving unit, or to a beam-directing element configured to redirect the power to the receiving unit, and may be configured to gradually increase an amount of power beamed from the power beaming unit. The power beaming unit may be configured to beam electromagnetic power (e.g., optical or RF), and may include a laser that generates a power beam. The power beam may be pulsed or continuous. The power source may further include an impingement detector configured to detect that the beamed power has encountered an obstruction, for example by detecting scattered or reflected radiation. The power beaming unit may be configured to suspend or terminate transmission upon detection that the beamed power has encountered an obstruction.

In another aspect, a power receiver configured to receive power beamed from a power source includes a signal receiver configured to detect a broadcast signal indicative of power availability, a transmission unit configured to transmit a request for power in response to the detected signal, and a power receiving unit configured to accept power beamed from a power source at an aperture. The power receiving unit may be configured to accept electromagnetic (e.g., optical or RF) or acoustic power. The transmission unit may be configured to transmit a request for power by generating and transmitting a request signal or by reflecting (and optionally modulating) the broadcast signal. The request for power may include a signal including location information for the power receiving unit, or power or economic needs of the power receiver (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). The signal receiver may configured to receive an electromagnetic signal (e.g., optical or RF) or an acoustic signal. The power receiver may be configured to receive a data transmission from a power source, for example for negotiating power delivery or payment characteristics, for negotiating termination of power delivery, for authenticating identity of the power receiver, or for monitoring receipt of power by the power receiver. The power beam from the power source may serve as a carrier wave for the data transmission, or the data transmission may be separate from the power beam. The power receiving unit may be configured to reposition itself to adjust power reception, to communicate a power reception level to a user, to communicate a power reception level to the power source, or to recommend to a user a change in orientation or position to adjust power reception.

In another aspect, a power receiver configured to receive power beamed from a power source includes a signal receiver configured to detect a scanned signal indicative of power availability, a transmission unit configured to transmit a request for power in the form of a retroreflection of the detected signal, and a power receiving unit configured to accept power beamed from a power source. The transmission unit may be further configured to modulate the retroreflected broadcast signal or to transmit an additional power request signal to the power source in response to the scanned signal (e.g., an electromagnetic or an acoustic signal, a signal over a wired channel, or a signal via the internet). The transmission unit may be configured to transmit a request for power including a signal including location information for the power receiving unit, information describing power needs of the power receiver (e.g., power type, wavelength, pulse characteristics, power amount, energy amount, polarization, power-vs-time profile, time window, offset of aperture, aperture size, or aperture attitude), or information describing economic parameters of power transmission (e.g., acceptable price, ability to pay, mode of payment, or identifying information for the receiving unit). The signal receiver may be configured to receive an electromagnetic (e.g., optical or RF) or acoustic signal. The power receiver may be configured to receive a data transmission from a power source, for example for negotiating power delivery characteristics, for negotiating payment characteristics, for negotiating termination of power delivery, for authenticating identity of the power receiver, or for monitoring receipt of power by the power receiver. The power beam may serve as a carrier wave for the data transmission, or the data transmission may be separate from the power beam. The power receiving unit may be configured to reposition itself to adjust power reception, to communicate a power reception level to a user, to communicate a power reception level to the power source, or to recommend to a user a change in orientation or position to adjust power reception.

In another aspect, a method of transmitting power includes initiating contact with a receiving unit by broadcasting a signal (e.g., electromagnetic or acoustic) indicating an ability to supply power, receiving a request for power from the receiving unit in response to the broadcast signal, and beaming power (e.g., electromagnetic power such as optical or RF, or acoustic power) to the receiving unit in response to the request. Beaming power may include beaming power within an enclosed space. Broadcasting may be according to a time schedule or in response to a detected condition (e.g., detection of a person in a broadcast area). Receiving a request for power may include receiving a transmission from the receiving unit or receiving a reflection of the broadcast signal from the receiving unit, and may include receiving location information for the receiving unit (e.g., encoded into a signal received from the receiving unit or determined by a path of a received signal, for example determined by scanning, imaging, or using a directional antenna). The request for power may include information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). Receiving the request for power may include receiving identifying information for the receiving unit and determining a location for the receiving unit using the identifying information (e.g., by determining a previous location for the receiving unit or by accessing a location database). The method may include determining an attitude of the receiving unit. The method may further include sending a signal to the receiving unit (e.g., electromagnetic or acoustic), for example by modulating the beamed power to the receiving unit or by transmitting a signal via a separate channel from the beamed power. Power may be beamed directly to the receiving unit or to a beam-directing element configured to redirect the power to the receiving unit, and may include gradually increasing an amount of power beamed.

In another aspect, a method of transmitting power includes initiating contact with a receiving unit by scanning a signal indicating an ability to supply power (e.g., an electromagnetic or acoustic signal), receiving a request for power from the receiving unit in response to the scanned signal in the form of a reflection of the signal, and beaming power (e.g., electromagnetic power such as optical or RF) to the receiving unit in response to the request. The method may further include discontinuing scanning the signal in response to receiving a request for power. Beaming power may include beaming power within an enclosed space. Scanning may include initiating scanning according to a time schedule or in response to a detected condition such as detection of a person in a signaling area. Receiving a request for power from the receiving unit includes receiving the request in the form of a modulated reflection of the scanned signal, and the method may further include interpreting the modulated reflection. The method may further include receiving additional power request information from the power receiver via a different channel from the request for power, for example an electromagnetic or acoustic transmission, a wired transmission, or an internet transmission. Receiving a request for power from the receiving unit may include receiving the request in the form of a retroreflection of the scanned signal, and may include receiving location information for the receiving unit, for example encoded into a signal received from the receiving unit or determined from a path of a signal received from the receiving unit. Receiving the request for power may include receiving information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). Receiving the request for power may include receiving identifying information for the receiving unit, and determining a location for the receiving unit using the identifying information, for example by determining a previous location for the receiving unit or by accessing a location database. The method may include determining an attitude of the receiving unit, and may further include sending a signal to the receiving unit (e.g., an electromagnetic signal such as an optical or RF signal or an acoustic signal), for example by modulating the beamed power to the receiving unit or by transmitting a signal via a separate channel from the beamed power. Power may be beamed directly to the receiving unit or to a beam-directing element configured to redirect the power to the receiving unit, and beaming may include gradually increasing an amount of power beamed. In another aspect, a method of transmitting power includes broadcasting a signal indicating an ability to supply power, receiving a request for power from a receiving unit in response to the broadcast signal, and determining whether to beam power to the receiving unit in response to the request. The method may further include beaming power to the receiving unit or receiving power request information from the receiving unit (e.g., a requested characteristic of beamed power or proposed payment terms, in which case the method may further include sending counteroffer payment terms) and using the received information to determine whether to beam power to the receiving unit. Determining whether to beam power to the receiving unit may include determining whether to initiate, suspend, or terminate power beaming. In another aspect, a method of transmitting power includes scanning a signal indicating an ability to supply power, receiving a request for power from a receiving unit in response to the scanned signal, and determining whether to beam power to the receiving unit in response to the request. The method may further include beaming power to the receiving unit or receiving power request information from the receiving unit (e.g., a requested characteristic of beamed power or proposed payment terms, in which case the method may further include sending counteroffer payment terms) and using the received information to determine whether to beam power to the receiving unit. Determining whether to beam power to the receiving unit may include determining whether to initiate, suspend, or terminate power beaming.

In another aspect, a method of receiving power includes receiving an initial broadcast signal (e.g., an electromagnetic or acoustic signal) indicating an ability of a power source to supply power, transmitting a request for power in response to the broadcast signal, and receiving beamed power in response to the request. Transmitting a request for power may include generating and transmitting a request signal or reflecting the broadcast signal (e.g., retroreflecting or modulating the broadcast signal). Transmitting a request for power may include transmitting location information for a power receiver or information describing power needs of a power receiver (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). The method may further include receiving a data transmission from the power source, for example superimposed on a power beam or in a separate channel from the beamed power. Receiving beamed power may include repositioning a power receiving unit to adjust power reception, communicating a power reception level to a user, communicating a power reception level to the power source, recommending to a user a change in orientation or position to adjust power reception, or changing orientation or position for the power receiving unit to adjust power reception. Transmitting a request for power may include transmitting identity information. The method may further include receiving a data transmission from the power source for negotiating a power delivery characteristic, for negotiating a payment characteristic, for negotiating termination of power delivery, for authenticating identity, or for monitoring receipt of power.

In another aspect, a method of receiving power includes receiving an initial signal indicating an ability of a power source to supply power (e.g., an electromagnetic or acoustic signal), transmitting a request for power in response to the broadcast initial signal in the form of an optionally modulated retroreflection of the initial signal, and receiving beamed power in response to the request. Transmitting a request for power may include transmitting location information for a power receiver, or transmitting information describing power needs of a power receiver (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). The method may further include receiving a data transmission from the power source, for example superimposed on a power beam or in a separate channel from the beamed power. Receiving beamed power may include repositioning a power receiving unit to adjust power reception, communicating a power reception level to a user, communicating a power reception level to the power source, recommending to a user a change in orientation or position to adjust power reception, or changing orientation or position for the power receiving unit to adjust power reception. Transmitting a request for power may include transmitting identity information. The method may further include receiving a data transmission from the power source for negotiating a power delivery characteristic, for negotiating a payment characteristic, for negotiating termination of power delivery, for authenticating identity, or for monitoring receipt of power. In another aspect, a power source configured to beam power to a receiving unit includes a location unit configured to locate a receiving unit in need of power and a power beaming unit configured to beam power to the receiving unit. The location unit locates the receiving unit by receiving an optical signal requesting power from the receiving unit in response to the broadcast signal and transmitting a response to the optical signal indicating a willingness to transmit power. Receiving an optical signal may include detecting power receiver optical indicia, receiving an optical beam, or receiving a laser beam. In another aspect, a power source configured to beam power to a receiving unit includes a power beaming unit configured to beam optical power and a location unit configured to locate a receiving unit in need of power by receiving a radio frequency signal requesting power from the receiving unit, locating an optical beam path from the power beaming unit to the receiving unit, and transmitting a response to the optical signal indicating a willingness to transmit power. In another aspect, a power source configured to beam power to a receiving unit includes a location unit and a power beaming unit configured to beam power to the receiving unit. The location unit is configured to locate a receiving unit in need of power by receiving an internet communication requesting power from the receiving unit and transmitting a response to the optical signal indicating a willingness to transmit power. In another aspect, a system for supplying beamed power to a receiving unit includes a location unit and a plurality of power beaming units, each configured to beam power to a receiving unit. The location unit is configured to locate a target receiving unit in need of power by broadcasting a signal indicative of the system's ability to supply power (e.g., an electromagnetic or acoustic signal) and receiving a request for power from the receiving unit in response to the broadcast signal. The location unit may be colocated with one of the plurality of power beaming units. The system may include a plurality of location units, in which case each power beaming unit may be colocated with a member of the plurality of location units. The system may further include a decision unit configured to designate a member of the plurality of power beaming units to beam power to a receiving unit in response to a request therefrom, for example the member of the plurality of power beaming units in closest physical proximity to the requesting receiving unit, the member of the plurality of power beaming units having the shortest unobstructed power beam path length, the member of the plurality of power beaming units having the highest projected power intensity, or a member of the plurality of power beaming units having a power characteristic (e.g., power type, wavelength, pulse characteristics, power amount, polarization, power-vs-time profile, or time window) or transaction characteristic (e.g., acceptable price, ability to pay, mode of payment, or identifying information for the receiving unit) corresponding to a characteristic requested by the receiving unit. The decision unit may be configured to determine whether to initiate, suspend, or terminate power beaming. The location unit may be configured to receive a request for power in the form of a transmission from the receiving unit or in the form of a reflection of the broadcast signal from the receiving unit. The request for power from the receiving unit may include location information for the receiving unit, for example encoded in a signal received from the receiving unit or determined from a path of a signal received from the receiving unit (e.g., by scanning, by imaging, or by using a directional antenna). The location unit may be configured to receive a request for power including information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). The location unit may be configured to exchange data with the receiving unit, and may be configured to transmit data to the receiving unit by modulating the beamed power from a member of the plurality of power beaming units or via a separate channel from the beamed power from a member of the plurality of power beaming units. At least a subset of the plurality of power beaming units may be configured to beam power directly to the receiving unit or to a beam-directing element configured to redirect the power to the receiving unit, and may be configured to gradually increase an amount of power beamed from the power beaming unit. At least a subset of the plurality of power beaming units may be configured to beam electromagnetic power (e.g. optical or RF power). In another aspect, a system for supplying beamed power to a receiving unit includes a location unit and a plurality of power beaming units, each configured to beam power to a receiving unit. The location unit is configured to locate a target receiving unit in need of power by scanning a signal indicative of the system's ability to supply power and receiving a request for power from the receiving unit in response to the scanned signal. The location unit may be colocated with one of the plurality of power beaming units. The system may include a plurality of location units, in which case each power beaming unit may be colocated with a member of the plurality of location units. The system may further include a decision unit configured to designate a member of the plurality of power beaming units to beam power to a receiving unit in response to a request therefrom, for example the member of the plurality of power beaming units in closest physical proximity to the requesting receiving unit, the member of the plurality of power beaming units having the shortest unobstructed power beam path length, the member of the plurality of power beaming units having the highest projected power intensity, or a member of the plurality of power beaming units having a power characteristic (e.g., power type, wavelength, pulse characteristics, power amount, polarization, power-vs-time profile, or time window) or transaction characteristic (e.g., acceptable price, ability to pay, mode of payment, or identifying information for the receiving unit) corresponding to a characteristic requested by the receiving unit. The decision unit may be configured to determine whether to initiate, suspend, or terminate power beaming. The location unit may be configured to receive a request for power in the form of a transmission from the receiving unit or in the form of a reflection of the scanned signal from the receiving unit. The request for power from the receiving unit may include location information for the receiving unit, for example encoded in a signal received from the receiving unit, determined from a path of a signal received from the receiving unit (e.g., by scanning, by imaging, or by using a directional antenna), or determined from a position of a component of the location unit at the time of receipt of the request for power (e.g., the direction of the scanning beam at the time of the request). The location unit may be configured to receive a request for power including information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit). The location unit may be configured to exchange data with the receiving unit, and may be configured to transmit data to the receiving unit by modulating the beamed power from a member of the plurality of power beaming units or via a separate channel from the beamed power from a member of the plurality of power beaming units. At least a subset of the plurality of power beaming units may be configured to beam power directly to the receiving unit or to a beam-directing element configured to redirect the power to the receiving unit, and may be configured to gradually increase an amount of power beamed from the power beaming unit. At least a subset of the plurality of power beaming units may be configured to beam electromagnetic power (e.g. optical or RF power). The location unit may be configured to initiate broadcasting a signal in response to a received initiation signal, for example broadcast by the receiving unit, requested by the receiving unit, or received from a triggering unit remote from the receiving unit.

In another aspect, a method of supplying beamed power from a plurality of power beaming units to a receiving unit includes broadcasting a signal indicating an ability to supply power (e.g., an electromagnetic or acoustic signal), receiving a request for power from the receiving unit in response to the broadcast signal, and beaming power (e.g., electromagnetic power such as optical or RF power) from one of the plurality of power beaming units to the receiving unit in response to the request. Broadcasting a signal and receiving a request for power may occur at a common location, and broadcasting a signal may include broadcasting a signal from a plurality of locations. Broadcasting may occur according to a time schedule or in response to a detected condition. Receiving a request may include receiving a request from a plurality of locations. Beaming power may include beaming power within an enclosed space. Receiving a request for power may include receiving a transmission from the receiving unit or receiving a reflection of the broadcast signal from the receiving unit, and may include receiving location information for the receiving unit, for example determined from a path of a signal received from the receiving unit (e.g., by scanning, imaging, or using a directional antenna), information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit), or identifying information for the receiving unit, in which case a location for the receiving unit may be determined, for example by determining a previous location for the receiving unit or accessing a location database. The method may further include determining an attitude of the receiving unit, or sending a signal to the receiving unit (e.g., an electromagnetic or acoustic signal), for example by modulating the beamed power to the receiving unit or via a separate channel from the beamed power. Beaming power may include beaming power directly to the receiving unit or to a beam-directing element configured to redirect the power to the receiving unit, and may include gradually increasing an amount of power beamed.

In another aspect, a method of supplying beamed power from a plurality of power beaming units to a receiving unit includes scanning a signal indicating an ability to supply power (e.g., an electromagnetic or acoustic signal), receiving a request for power from the receiving unit in response to the scanned signal in the form of a reflection of the scanned signal, and beaming power (e.g., electromagnetic power such as optical or RF) from one of the plurality of power beaming units to the receiving unit in response to the request. Scanning a signal and receiving a request for power may occur at a common location, and scanning a signal may include scanning a signal from a plurality of locations. Scanning may occur according to a time schedule or in response to a detected condition. Receiving a request may include receiving a request from a plurality of locations. Beaming power may include beaming power within an enclosed space. Receiving a request for power may include receiving a transmission from the receiving unit or receiving a reflection of the broadcast signal from the receiving unit, and may include receiving location information for the receiving unit, for example determined from a path of a signal received from the receiving unit (e.g., by scanning, imaging, or using a directional antenna), information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit), or identifying information for the receiving unit, in which case a location for the receiving unit may be determined, for example by determining a previous location for the receiving unit or accessing a location database. The method may further include determining an attitude of the receiving unit, or sending a signal to the receiving unit (e.g., an electromagnetic or acoustic signal), for example by modulating the beamed power to the receiving unit or via a separate channel from the beamed power. Beaming power may include beaming power directly to the receiving unit or to a beam-directing element configured to redirect the power to the receiving unit, and may include gradually increasing an amount of power beamed.

In another aspect, a method of requesting power from one of a plurality of power beaming units includes receiving a broadcast signal including location information for a plurality of power beaming units, selecting a subset of the plurality of power beaming units for a power request, and transmitting a request signal requesting power transmission from the subset. Receiving a broadcast signal may include receiving a plurality of broadcast signals, receiving a broadcast signal from each member of the plurality of power beaming units, receiving a single signal describing all members of the plurality of power beaming units, or receiving information about power transmission characteristics of at least one of the power beaming units. Selecting a subset may include determining which members of the plurality of power beaming units are compatible with a power receiver. The method may further include receiving a power transmission from at least one member of the subset.

In another aspect, a system for supplying beamed power to a plurality of receiving units includes a location unit and a power beaming unit configured to beam power to a plurality of receiving units in response to the request for power. The location unit is configured to locate a target receiving unit in need of power by broadcasting a beam indicative of the system's ability to supply power (e.g., an electromagnetic or acoustic beam) and receiving a request for power from the receiving unit in response to the broadcast beam. The power beaming unit may be configured to beam power to a plurality of receiving units simultaneously (e.g., by splitting an output beam or by generating a plurality of output beams) or in series (e.g., by scanning a power beam to each member of the plurality of receiving units in turn or by monitoring power needs of each member of the plurality of receiving units and directing the power beam to each unit according to a determination of its relative priority for power). The location unit may be configured to receive a request for power in the form of a transmission from the receiving unit or in the form of a reflection of the broadcast signal from the receiving unit. The request for power from the receiving unit may include location information for the receiving unit (e.g., encoded in a signal received from the receiving unit or determined from a path of a signal received from the receiving unit, for example by scanning or by imaging). The location unit may be configured to receive a request for power including information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit), and may be configured to exchange data with the receiving unit, for example by modulating the beamed power from the power beaming unit or via a separate channel from the beamed power from the power beaming unit. The power beaming unit may be configured to beam power directly to the receiving unit or to a beam-directing element configured to redirect the power to the receiving unit, and may be configured to gradually increase an amount of power beamed from the power beaming unit. In another aspect, a system for supplying beamed power to a plurality of receiving units includes a location unit and a power beaming unit configured to beam power to a plurality of receiving units in response to the request for power. The location unit is configured to locate a target receiving unit in need of power by scanning a beam indicative of the system's ability to supply power (e.g., an electromagnetic or acoustic beam) and receiving a request for power from the receiving unit in the form of a retroreflection of the scanned beam. The power beaming unit may be configured to beam power to a plurality of receiving units simultaneously (e.g., by splitting an output beam or by generating a plurality of output beams) or in series (e.g., by scanning a power beam to each member of the plurality of receiving units in turn or by monitoring power needs of each member of the plurality of receiving units and directing the power beam to each unit according to a determination of its relative priority for power). The request for power from the receiving unit may include location information for the receiving unit (e.g., encoded in a signal received from the receiving unit or determined from a path of a signal received from the receiving unit, for example by scanning or by imaging). The location unit may be configured to receive a request for power including information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit), and may be configured to exchange data with the receiving unit, for example by modulating the beamed power from the power beaming unit or via a separate channel from the beamed power from the power beaming unit. The power beaming unit may be configured to beam power directly to the receiving unit or to a beam-directing element configured to redirect the power to the receiving unit, and may be configured to gradually increase an amount of power beamed from the power beaming unit. In another aspect, a method of supplying beamed power to a plurality of receiving units includes broadcasting a signal indicating an ability to supply power (e.g., an electromagnetic or acoustic signal), receiving a request for power from at least two members of the plurality of receiving units in response to the broadcast signal, and beaming power to the at least two receiving units in response to the request. Broadcasting a signal and receiving a request for power may occur at a common location, and broadcasting a signal may include broadcasting a signal from a plurality of locations. Broadcasting may include broadcasting according to a time schedule or in response to a detected condition. Beaming power may include beaming within an enclosed space. Receiving a request for power may include receiving a transmission from at least one member of the plurality of receiving units, or receiving a reflection of the broadcast signal from at least one member of the plurality of receiving units, and may include receiving location information for at least one member of the plurality of receiving units, for example encoded into a signal received from the at least one member of the plurality of receiving units or determined from a path of a signal received from the at least one member of the plurality of receiving units (e.g., by scanning, imaging, or using an directional antenna). Receiving the request for power may include receiving information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit) or receiving identifying information for at least one member of the plurality of receiving units, in which case the identifying information may be used to determine a location for the at least one member of the plurality of receiving units, for example by determining a previous location for the at least one member of the plurality of receiving units or accessing a location database. The method may further include determining an attitude of at least one member of the plurality of receiving units, or sending a signal to at least one member of the plurality of receiving units (e.g., an electromagnetic signal or an acoustic signal), for example by modulating the beamed power to the receiving unit or via a separate channel from the beamed power. Beaming power may include beaming power directly to the receiving unit or to a beam-directing element configured to redirect the power to the receiving unit, and may include gradually increasing an amount of power beamed.

In another aspect, a method of supplying beamed power to a plurality of receiving units includes scanning a signal indicating an ability to supply power (e.g., an electromagnetic or acoustic signal), receiving a request for power from at least two members of the plurality of receiving units in the form of a reflection of the scanned signal, and beaming power to the at least two receiving units in response to the request. Scanning a signal and receiving a request for power may occur at a common location, and scanning a signal may include scanning a signal from a plurality of locations. Scanning may include scanning according to a time schedule or in response to a detected condition. Beaming power may include beaming within an enclosed space. Receiving a request for power may include receiving location information for at least one member of the plurality of receiving units, for example encoded into a signal received from the at least one member of the plurality of receiving units or determined from a path of a signal received from the at least one member of the plurality of receiving units (e.g., by scanning, imaging, or using an directional antenna). Receiving the request for power may include receiving information describing power needs (e.g., power type, wavelength, pulse characteristics, power amount, energy amount, polarization, power-vs-time profile, time window, offset of aperture, aperture size, aperture attitude, acceptable price, ability to pay, mode of payment, or identifying information for the receiving unit) or receiving identifying information for at least one member of the plurality of receiving units, in which case the identifying information may be used to determine a location for the at least one member of the plurality of receiving units, for example by determining a previous location for the at least one member of the plurality of receiving units or accessing a location database. The method may further include determining an attitude of at least one member of the plurality of receiving units, or sending a signal to at least one member of the plurality of receiving units (e.g., an electromagnetic signal or an acoustic signal), for example by modulating the beamed power to the receiving unit or via a separate channel from the beamed power. Beaming power may include beaming power directly to the receiving unit or to a beam-directing element configured to redirect the power to the receiving unit, and may include gradually increasing an amount of power beamed.

In another aspect, a method of determining relative priority of receiving units for power beaming includes receiving a first request for power from a first receiving unit including a first power specification request, receiving a second request for power from a second receiving unit including a second power specification request, determining a relative priority for the first and second requests according to a predetermined selection method, and instructing a first power beaming unit to beam power to the receiving unit having a higher determined priority. At least one of the first and second power specification requests may include a datum selected from the group consisting of power type, wavelength, pulse characteristics, power amount, polarization, power-vs-time profile, time window, acceptable price, ability to pay, mode of payment, and identifying information for the receiving unit. Determining a relative priority may include determining relative profitability for the first and second power specification requests or determining availability of power corresponding to the first and second power specification requests. The method may further include instructing the first power beaming unit or the second power beaming unit to beam power to the receiving unit having a lower determined priority. Instructing the first power beaming unit to beam power may include sending a signal to the first power beaming unit or sending a signal to a remote unit configured to instruct the first power beaming unit.

In another aspect, a system for supplying beamed power includes a power beaming unit configured to supply power to a receiving unit in the form of a power beam, a guard beaming unit configured to produce a guard beam configured to substantially surround the power beam (e.g., an electromagnetic or acoustic guard beam), and a detection unit configured to recognize an imminent impingement on the power beam. The detection unit includes a receiver configured to receive a guard beam reflected from the receiving unit and decision circuitry configured to determine that the reflected guard beam has been interrupted and to direct the power beaming unit to modulate the power beam. Modulating the power beam may include suspending or terminating the power beam. The system may further include a beam combiner configured to combine the power beam and the guard beam in a substantially collinear arrangement. The guard beam may be substantially cylindrical, may include a plurality of beams arranged around the power beam, may be configured to scan an area substantially surrounding the power beam, or may include a plurality of substantially concentric beams. The guard beaming unit may be configured to produce a guard beam by reflecting energy from a retroreflector array located at the receiving unit, or may produce the guard beam by reflecting fringes of the power beam. The guard beam may differ in wavelength, polarity, modulation, or character from the power beam. The decision unit may be configured to determine a characteristic of an object impinging on the guard beam (e.g., speed, direction, size, shape, or composition). The system may further include a beam optimization unit configured to use information received from the receiver to adjust a power beam characteristic (e.g., beam spot size, shape, power, intensity, or power-time profile). The power beaming unit may be configured to beam power within an enclosed space, and may be configured to beam power directly to the receiving unit or to a beam-directing element configured to redirect the power to the receiving unit. The power beaming unit may be configured to beam electromagnetic power (e.g., optical or RF), and may be configured to gradually increase an amount of power beamed. It may include a laser that generates a power beam, and may be configured to beam pulsed or continuous power. In another aspect, a system for supplying beamed power includes a power beaming unit configured to supply power to a receiving unit in the form of a power beam, a guard beaming unit configured to produce a guard beam configured to substantially surround the power beam (e.g., an electromagnetic or acoustic guard beam), and a detection unit configured to recognize an imminent impingement on the power beam. The detection unit includes a receiver configured to receive a guard beam reflected from the receiving unit and decision circuitry configured to determine that the reflected guard beam has been interrupted and to direct the power beaming unit to reroute the power beam. The system may further include a beam combiner configured to combine the power beam and the guard beam in a substantially collinear arrangement. The guard beam may be substantially cylindrical, may include a plurality of beams arranged around the power beam, may be configured to scan an area substantially surrounding the power beam, or may include a plurality of substantially concentric beams. The guard beaming unit may be configured to produce a guard beam by reflecting energy from a retroreflector array located at the receiving unit, or may produce the guard beam by reflecting fringes of the power beam. The guard beam may differ in wavelength, polarity, modulation, or character from the power beam. The decision unit may be configured to determine a characteristic of an object impinging on the guard beam (e.g., speed, direction, size, shape, or composition), and may also be configured to select a beam-directing element and to instruct the power beaming unit to direct the power beam toward the beam-directing element, and further to direct the selected beam-directing element to redirect the power beam toward the receiving unit or toward a second beam-directing element. The system may further include a beam optimization unit configured to use information received from the receiver to adjust a power beam characteristic (e.g., beam spot size, shape, power, intensity, or power-time profile). The power beaming unit may be configured to beam power within an enclosed space, and may be configured to beam power directly to the receiving unit or to a beam-directing element configured to redirect the power to the receiving unit. The power beaming unit may be configured to beam electromagnetic power (e.g., optical or RF), and may be configured to gradually increase an amount of power beamed. It may include a laser that generates a power beam, and may be configured to beam pulsed or continuous power.

In another aspect, a method for supplying beamed power includes directing a composite power beam toward a receiving unit, the composite power beam including a main power beam and a guard beam substantially surrounding the main power beam, receiving a reflection of at least a portion of the composite power beam from the receiving unit, the reflection including a reflection of at least a portion of the guard beam, monitoring the received reflection to identify an impingement on the guard beam, and modulating at least the main power beam. Modulating the power beam may include suspending or terminating the power beam. The method may further include combining the power beam and the guard beam in a substantially collinear arrangement. The guard beam may be substantially cylindrical, may include a plurality of beams arranged around the power beam, may be configured to scan an area substantially surrounding the power beam, or may include a plurality of substantially concentric beams. Producing a guard beam may include reflecting energy from a retroreflector array located at the receiving unit or reflecting fringes of the power beam. The guard beam may differ in wavelength, polarity, modulation, or character from the power beam. The method may further include determining a characteristic of an object impinging on the guard beam (e.g., speed, direction, size, shape, or composition). The guard beam may be electromagnetic or acoustic. The method may further include using the monitored received reflection to adjust a power beam characteristic (e.g., beam spot size, shape, intensity, power, or power-time profile). The composite power beam may be directed within an enclosed space, and may be beamed directly to the receiving unit or to a beam-directing element configured to redirect the power to the receiving unit. The main power beam may be electromagnetic (e.g., optical or RF), may be of gradually increasing power, and may be continuous or pulsed.

In another aspect, a method for supplying beamed power includes directing a composite power beam toward a receiving unit, the composite power beam including a main power beam and a guard beam substantially surrounding the main power beam, receiving a reflection of at least a portion of the composite power beam from the receiving unit, the reflection including a reflection of at least a portion of the guard beam, monitoring the received reflection to identify an impingement on the guard beam, and rerouting the composite power beam. The method may further include combining the power beam and the guard beam in a substantially collinear arrangement. The guard beam may be substantially cylindrical, may include a plurality of beams arranged around the power beam, may be configured to scan an area substantially surrounding the power beam, or may include a plurality of substantially concentric beams. Producing a guard beam may include reflecting energy from a retroreflector array located at the receiving unit or reflecting fringes of the power beam. The method may further include determining a characteristic of an object impinging on the guard beam (e.g., speed, direction, size, shape, or composition). The guard beam may be electromagnetic or acoustic, and may differ in wavelength, polarity, modulation, or character from the power beam. Rerouting the composite power beam may include selecting a beam-directing element and instructing the power beaming unit to direct the power beam toward the selected beam-directing element, and may further include directing the beam-directing element to redirect the power beam toward the receiver or toward a second beam-directing element. The method may further include using the monitored received reflection to adjust a power beam characteristic (e.g., beam spot size, shape, intensity, power, or power-time profile). The composite power beam may be directed within an enclosed space, and may be beamed directly to the receiving unit or to a beam-directing element configured to redirect the power to the receiving unit. The main power beam may be electromagnetic (e.g., optical or RF), may include a laser, may be of gradually increasing power, and may be continuous or pulsed.

In another aspect, a receiving unit for receiving a power beam includes an aperture including a power converter configured to convert the power beam to another form and a plurality of retroreflectors arranged about the aperture configured to retroreflect at least a portion of the power beam. The power converter may be a photoreceptor (e.g., a photovoltaic cell, a photodiode, or a charge-coupled device), or it may be an electroacoustic transducer.

In another aspect, a system for supplying beamed power includes a power beaming unit configured to supply power to a receiving unit in the form of a power beam, a guard beaming unit configured to produce a guard beam configured to substantially surround the power beam and differing in modulation, polarization, or character from the power beam (e.g., an electromagnetic or acoustic guard beam), and a beam interruption unit configured to respond to a direction from the receiving unit to prevent a detected imminent impingement on the power beam. The beam interruption unit may be configured to suspend, terminate, or reroute the power beam to prevent the detected imminent impingement. The system may further include a beam combiner configured to combine the power beam and the guard beam in a substantially collinear arrangement. The guard beam may be substantially cylindrical, may include a plurality of beams arranged around the power beam, may be configured to scan an area substantially surrounding the power beam, or may include a plurality of substantially concentric beams. The beam interruption unit may be configured to determine a characteristic of an object impinging on the guard beam (e.g., speed, direction, size, shape, or composition). The power beaming unit may be configured to beam power within an enclosed space, and may be configured to beam power directly to the receiving unit or to a beam-directing element configured to redirect the power to the receiving unit. The power beaming unit may be configured to beam electromagnetic power (e.g., optical or RF), and may be configured to gradually increase an amount of power beamed. It may include a laser that generates a power beam, and may be configured to beam pulsed or continuous power. Direction from the receiving unit may be delivered as an electromagnetic signal, or as a cessation of an electromagnetic signal. In another aspect, a system for receiving beamed power from a power source, the beamed power including a guard beam substantially surrounding a power beam and differing in modulation, polarization, or character from the power beam, includes a power receiving unit configured to accept the power beam, a detection unit configured to recognize an imminent impingement on the power beam by detecting an impingement on the guard beam, and a beam interruption signaling unit configured to transmit a signal to the power source indicating interruption of the guard beam. The detection unit may be configured to distinguish an impingement on the guard beam from an impingement on the power beam by recognizing modulation or polarization.

In another aspect, a method of supplying beamed power includes directing a composite power beam toward a receiving unit, the composite power beam including a main power beam and a guard beam substantially surrounding the main power beam (e.g., an electromagnetic or acoustic guard beam), the guard beam differing in modulation, polarization, or character from the power beam, receiving information from the receiving unit concerning an imminent impingement on the guard beam, and responding to prevent the imminent impingement on the power beam. Responding to prevent an imminent impingement on the power beam may include suspending, terminating, or rerouting the power beam. The method may further include combining the power beam and the guard beam in a substantially collinear arrangement to form the composite power beam. The guard beam may be substantially cylindrical, may include a plurality of beams arranged around the power beam, may be configured to scan an area substantially surrounding the power beam, or may include a plurality of substantially concentric beams. The method may further include producing a guard beam by reflecting energy from a retroreflector array located at the receiving unit. The method may include determining a characteristic of an object impinging on the guard beam (e.g., speed, direction, size, shape, and composition), or using the monitored received reflection to adjust a power beam characteristic (e.g., beam spot size, shape, power, intensity, or power-time profile). Directing a composite power beam may include beaming power within an enclosed space, and may include beaming power directly to the receiving unit or beaming power to a beam-directing element configured to redirect the power to the receiving unit. The main power beam may be electromagnetic (e.g., optical or RF), may include a laser, may be of gradually increasing power, and may be continuous or pulsed. Receiving information from the receiving unit may include receiving a signal from the receiving unit or ceasing to receive a signal from the receiving unit. In another aspect, a system for supplying beamed power includes a location unit, a first beam-directing mechanism configured to change direction of a power beam, and a power beaming unit remote from the beam-directing mechanism, configured to beam power to the receiving unit by sending a power beam in a path selected to reach the receiving unit via the beam-directing mechanism. The location unit is configured to locate a receiving unit in need of power by broadcasting a beam indicative of its ability to supply power and receiving a request for power from the receiving unit in response to the broadcast beam. The power beaming unit is further configured to locate the beam-directing mechanism, and optionally to communicate the location of the beam-directing mechanism to the power beaming unit. The system may include a second beam-directing mechanism, and may further include beam-directing mechanism selection circuitry configured to direct the power beaming unit to direct the beam toward either the first or the second beam-directing mechanism. The first beam-directing mechanism may be configured to dynamically adjust the direction of the power beam to follow a moving power receiver. The location unit may be colocated with the power beaming unit or with the first beam-directing mechanism. The power beaming unit may be configured to beam power within an enclosed space, and may gradually increase an amount of power beamed. It may beam electromagnetic power (e.g., optical or RF), and may include a laser. The power beam may be pulsed or continuous. In another aspect, a method of beaming power includes broadcasting a signal indicating an ability to supply power, receiving a request from a receiving unit in response to the broadcast signal, and beaming power from a power beaming unit to a beam-directing unit configured to redirect the power to the receiving unit. Beaming power may include locating the first beam-directing unit and optionally communicating the location of the beam-directing unit to the power beaming unit. The method may further include dynamically adjusting the direction of the power beam to follow a moving receiving unit. Beaming power to a beam-directing unit may include directing power to a plurality of beam-directing units in series. Power may be beamed within an enclosed space, and may be gradually increased. The power beam may be electromagnetic (optical or RF), and may include a laser. It may be pulsed or continuous.

In another aspect, a system for supplying beamed power includes a location unit configured to locate a receiving unit in need of power by receiving a request for power from the receiving unit, a first beam-directing mechanism configured to change direction of a power beam, and a power beaming unit remote from the beam-directing mechanism, configured to beam power to the receiving unit by sending a power beam in a path selected to reach the receiving unit via the beam-directing mechanism. The power beaming unit may be further configured to locate the beam-directing mechanism and optionally to communicate the location of the beam-directing mechanism to the power beaming unit. The system may include a second beam-directing mechanism, and may further include beam-directing mechanism selection circuitry configured to direct the power beaming unit to direct the beam toward either the first or the second beam-directing mechanism. The first beam-directing mechanism may be configured to dynamically adjust the direction of the power beam to follow a moving power receiver. The location unit may be colocated with the power beaming unit, or with the first beam-directing mechanism. The power beaming unit may be configured to beam power within an enclosed space, and to gradually increase power. The power beam may be electromagnetic (optical or RF), and may include a laser. It may be pulsed or continuous.

In another aspect, a system for providing beamed power to a mobile receiving unit includes a first power beaming unit configured to beam power to a receiving unit in a first power zone and a second power beaming unit configured to beam power to the receiving unit in a second power zone. The first power beaming unit is configured to terminate power beaming as the receiving unit moves out of the first power zone and the second power beaming unit is configured to initiate power beaming as the receiving unit moves into the second power zone. The first power beaming unit may be configured to detect that the receiving unit has moved into the second power zone and to communicate to the second power beaming unit that the receiving unit has moved into the second power zone. The first power beaming unit may be configured to beam power within an enclosed space, and to gradually increase power. It may beam power directly to the receiving unit, or to a beam-directing element configured to redirect the power to the receiving unit. The power beam may be electromagnetic (optical or RF), and may include a laser. It may be pulsed or continuous.

In another aspect, a method for providing beamed power to a mobile receiving unit includes beaming power from a first sending location to the receiving unit at a first receiving location, determining that the receiving unit is moving from the first receiving location to a second receiving location, and beaming power from a second sending location to the receiving unit at the second receiving location. Determining may include detecting from the first sending location that the receiving unit is moving away from the first receiving location and communicating to the second sending location that the receiving unit is moving toward the second receiving location, or it may include receiving information from the receiving unit. Power may be beamed within an enclosed space, and may be gradually increased. The method may include beaming power directly to the receiving unit, or to a beam-directing element configured to redirect the power to the receiving unit. The power beam may be electromagnetic (optical or RF), and may include a laser. It may be pulsed or continuous.

In another aspect, a power source configured to beam power to a receiving unit includes a location unit, a first power beaming unit configured to beam power to the receiving unit, and a decision unit configured to determine that the receiving unit should be powered by a second power beaming unit and to direct the first power beaming unit to discontinue beaming power to the receiving unit upon transfer of responsibility for power beaming to the second power beaming unit. The location unit is configured to locate a receiving unit in need of power by initiating contact with the receiving unit by broadcasting a signal indicative of its ability to supply power, and receiving a request for power from the receiving unit in response to the broadcast signal. The decision unit may be configured to determine that the receiving unit should be powered by a second power beaming unit by determining that the receiving unit has entered a power zone corresponding to the second power beaming unit. The first power beaming unit may be configured to beam power within an enclosed space, and to gradually increase power. It may beam power directly to the receiving unit, or to a beam-directing element configured to redirect the power to the receiving unit. The power beam may be electromagnetic (optical or RF), and may include a laser. It may be pulsed or continuous. In another aspect, a system for providing beamed power to a mobile receiving unit includes a power beaming unit configured to beam power (e.g., electromagnetic power such as optical or RF) to the mobile receiving unit, and a path prediction unit configured to predict a motion of the mobile receiving unit. The power beaming unit may be configured to beam power directly to the receiving unit or to a beam-directing element configured to redirect the power to the receiving unit, and it may include a laser that generates a power beam. The path prediction unit may be configured to detect or to receive a signal from the receiving unit indicating a speed or direction of movement. It may use a history of movement of the receiving unit to predict a path for the unit.

In another aspect, a system for providing beamed power to a mobile receiving unit includes a power beaming unit configured to beam power and a plurality of beam-directing components configured to dynamically redirect power from the power beaming unit to the mobile receiving unit. The system may further include a movement determination unit configured to determine a movement characteristic of the mobile receiving unit, which may be configured to select a beam-directing component arranged to redirect power to the mobile receiving unit. The movement determination unit may be further configured to transmit an instruction to the selected beam-directing component indicating a beam direction.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
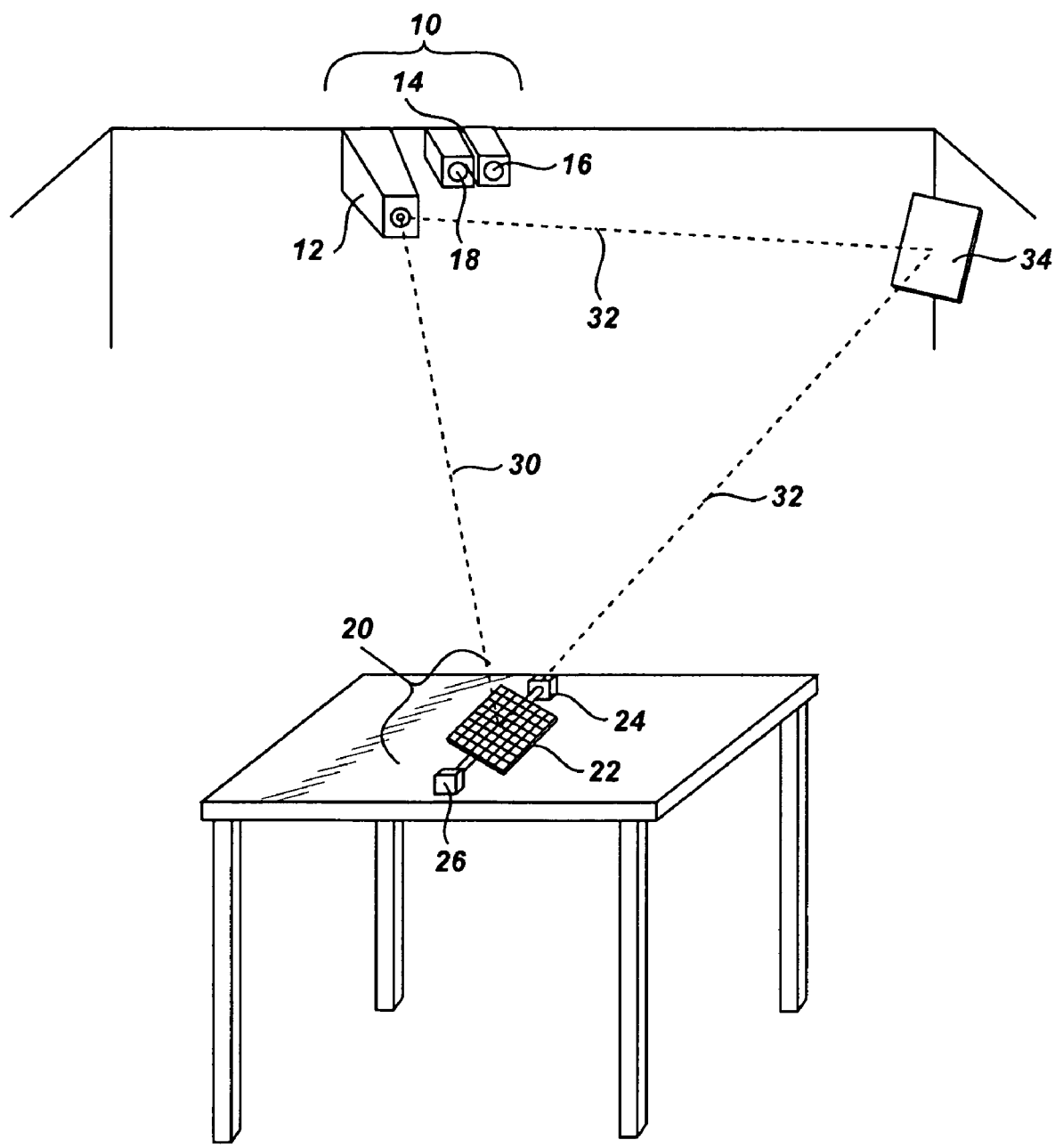
FIG. 1 is a schematic of power beaming system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As used herein, "broadcasting" encompasses transmitting a signal simultaneously to a plurality of locations, for example by transmitting a signal into space in a pattern that encompasses a substantial solid angle. In contrast, "scanning" encompasses sequentially transmitting a signal to a plurality of locations, for example by moving a narrow-beam transmitter to sweep through an area of space.

As used herein, "aperture" encompasses any region of a power receiver that converts beamed power to useful energy, such as a photoconverter region, or an opening or optic element that directs light to a photoconverter.

FIG. 1 illustrates a power beaming system for sending beamed power to a receiving unit. As shown, the system includes a power source 10 including a power beaming unit 12 and a location unit 14. Power beaming unit 12 may be configured to beam power in any of a variety of forms, for example as a laser or other electromagnetic beam (such as a visible light, microwave, radio frequency, ultraviolet, or infrared beam), as a particle beam, or as an acoustic beam (such as an ultrasonic beam). Power transmission may be continuous, pulsed, or according to a more complex spatiotemporal profile. Location unit 14 includes a transmitter 16 configured for a wide-area broadcast and a receiver 18 configured to receive a signal from a receiving unit in need of power. Further illustrated is a power receiver 20, which includes a signal receiver 22, a transmission unit 24, and a power receiving unit 26. The illustrated embodiment is configured to beam power within an enclosed space (e.g., a room), while other embodiments may be configured for power beaming outdoors or in open spaces.

In some embodiments, transmitter 16 may be configured to initiate broadcasting on a time schedule (e.g., every 20 milliseconds, every five minutes, every hour during the workday, or during a designated power availability period), or in response to a detected condition. For example, transmitter 16 may initiate broadcasting when it senses (or receives information from another source) that a person has entered the room (e.g., by sensing motion or sound, or by receiving an indication that the room lights have turned on), or it may detect a passive marker indicating a compatible power receiver (e.g., an identifying distinctive mark such as a checkerboard pattern or a distinctively colored retroreflector that may be detected by a visual scan). Such markers may further convey information about an associated receiver 20, such as power requirements, identity, or location of reception "target" (e.g., indicating that an antenna is placed between two such markers). Transmitter 16 may be configured to broadcast an electromagnetic signal (e.g., an optical or RF signal) or an acoustic signal, and receiver 18 may be configured to receive an electromagnetic or acoustic signal, which may not be of the same character or frequency as the signal broadcast by transmitter 16.

In some embodiments, power source 10 may further include a decision unit (not shown), which is configured to determine whether to beam power in response to a request from a power receiver 20. This decision may be based at least in part upon information received from the power receiver 20, such as a requested power characteristic or proposed payment terms. Determining whether to beam power may include deciding whether to initiate power beaming in response to a request (for example, deciding whether proposed payment terms are adequate or whether the power source is able to supply power meeting the requested parameters), deciding whether to suspend power beaming during operation (for example, to beam power to a higher-priority unit or to one that needs power only for a limited time), or deciding whether to terminate power beaming (for example, because a higher-priority request or one offering more generous payment terms is received, or because the power receiver indicates that power is no longer required). In embodiments where the power source 10 supplies power to a plurality of power receivers 20 on a sequential basis, the decision unit may also control scheduling of power transmission sequentially to the plurality of power receivers. The decision unit may further be configured to receive a transmission from the receiving unit confirming receipt of power or amount of power received, and in the latter case, may compare the amount of power received with the amount transmitted, for example to determine efficiency.

In some embodiments, location unit 14 may be configured to transmit data to power receiver 20, either via transmitter 16 or via a separate channel such as a separate transmitter or a wired connection (not shown), or via modulation of power beamed from power beaming unit 12. This data transmission may allow location unit 14 to negotiate power delivery terms (e.g., how much power on what schedule) or payment terms (e.g., price per unit of power or form of payment) with power receiver 20, or to authenticate the identity of power receiver 20 and monitor receipt of power by the unit.

In some embodiments, power may be beamed directly from power source 10 to power receiver 20, as indicated by dotted line 30 in FIG. 1. Additionally or alternatively, the power beam may be redirected by beam-directing elements, as indicated by dotted line 32 in FIG. 1, illustrating a power beam bouncing off of reflector 34. While the illustrated embodiment includes a reflector, it will be understood that other beam-directing elements may also be used, including but not limited to electromagnetic fields, waveguides, beam splitters, or optical fibers. Beam-directing elements may be used, for example, to avoid physical obstacles, to provide an adjustable beam direction from a fixed power source 10, or to split or modulate the power beam.

In some embodiments, power source 10 may include an impingement detector (not shown) configured to detect that the power beam has encountered an obstruction. The power beaming unit 12 may be configured to suspend or terminate power if an obstruction is detected. In some embodiments, the impingement detector may detect impingement by detecting scattered or reflected radiation, either from the main beam or from a guard beam akin to that described in U.S. Pat. No. 6,633,026, incorporated herein by reference, which describes a high-intensity power beam surrounded by a low-intensity "curtain," in which the high-intensity power beam is interrupted if the power receiver detects a break in the low-intensity "curtain" indicating impingement.

Power source 10 may be capable of delivering power at a range of intensities. In some embodiments, the power beam may initially be at a low intensity and gradually be increased, for example to allow time to detect impingement of the power beam at low power to minimize any potential damage, or to allow optimization of the power beam path, convergence, or shape (e.g., using beam-directing elements as described above, including possibly inserting astigmatism into the beam to match receiver shape or attitude) at low power to maximize efficiency of power transfer.

In the illustrated embodiment, transmission unit 24 is configured to transmit a request for power. For example, transmission unit 24 may be configured to transmit the request by generating and transmitting a request signal, or by reflecting the broadcast signal (e.g., by retroreflecting and modulating the broadcast signal). The request for power may include identity or location information for power receiver 20, information about power needs of power receiver 20, or information about economic parameters of requested power transmission. Signal receiver 22 may be configured to receive an electromagnetic (e.g., RF or optical) signal or an acoustic signal. Power receiving unit 26 is configured to accept power beamed from a power unit (e.g., to use to power a device), and may also accept data transmission from the power unit, for example as a carrier wave on the power beam or via a separate channel. This data transmission may include, for example, negotiation of power delivery characteristics or payment characteristics, negotiation of termination of power delivery, identity authentication information, or power receipt monitoring information. Power receiving unit 26 may be configured to reposition itself to adjust power reception (for example, changing attitude to align with a power beam direction), and may communicate with a user, for example to report a power reception level or to recommend a change in orientation or position to adjust power reception.

Figure 2:
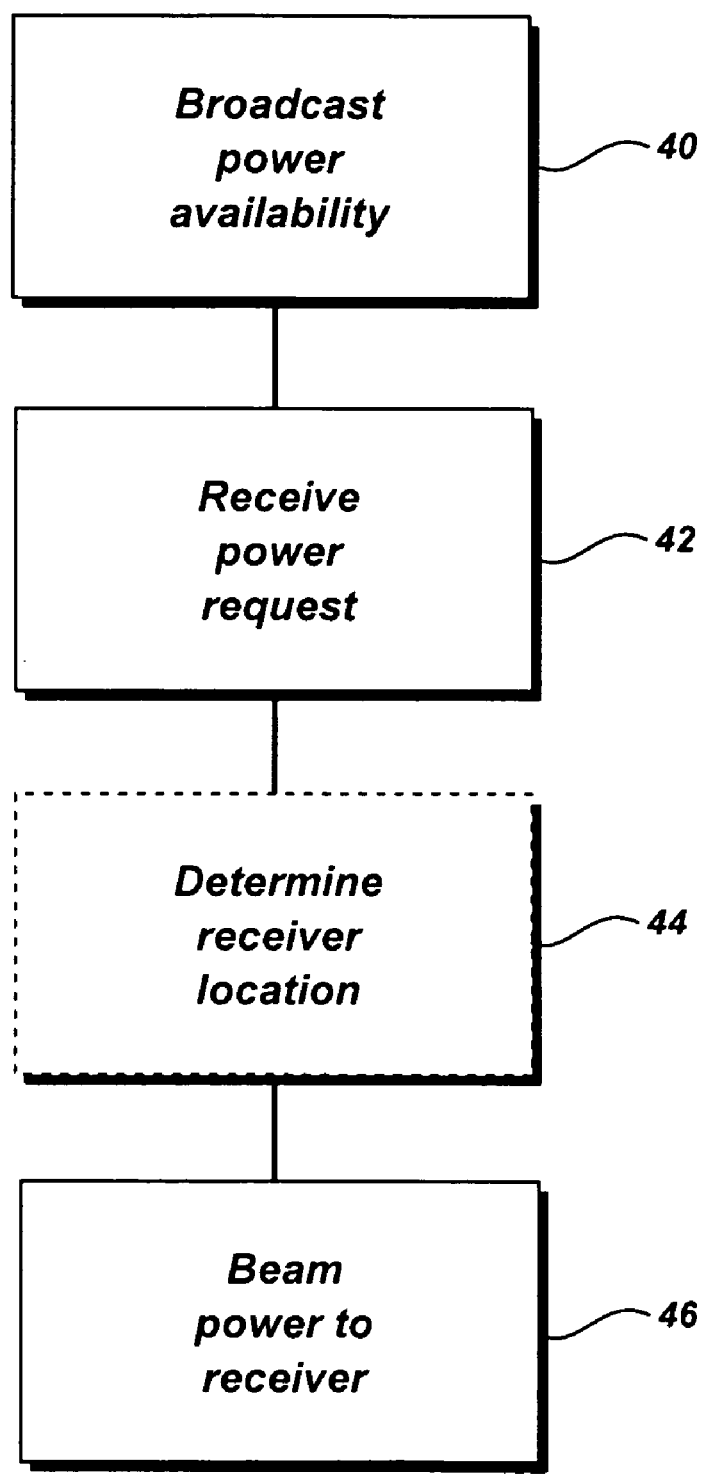
FIG. 2 is a flow chart illustrating operation of a power source.

FIG. 2 is a flow chart illustrating operation of a power source such as power source 10 of FIG. 1. As shown in step 40, location unit 14 broadcasts a signal via transmitter 16 to a wide area surrounding power source 10. As shown in step 42, location unit 14 receives a signal from power receiver 20 via receiver 18. In some embodiments, this signal may include location information for power receiver 20, either explicitly (e.g., in the form of an encoded signal, for example a modulated reflected signal or an independent signal) or implicitly (e.g., the location may be determinable from the direction of the received signal, which may be determined, for example, by scanning using a directional antenna or by imaging). Optionally, location unit 14 may interpret this signal or other information to determine a receiver location, as shown in step 44. In some embodiments, the signal may include identifying information for power receiver 20, in which case, location unit 14 may use the identifying information to determine a location for power receiver 20 (e.g., by accessing a location database, or by determining a previous location for the same unit). In some embodiments, location unit 14 may determine an attitude of the receiving unit (e.g., by signal strength, by interpreting a signal including attitude information, or by imaging).

As shown in step 46, power source 10 beams power to power receiver 20 via power beaming unit 12.

Figure 3:
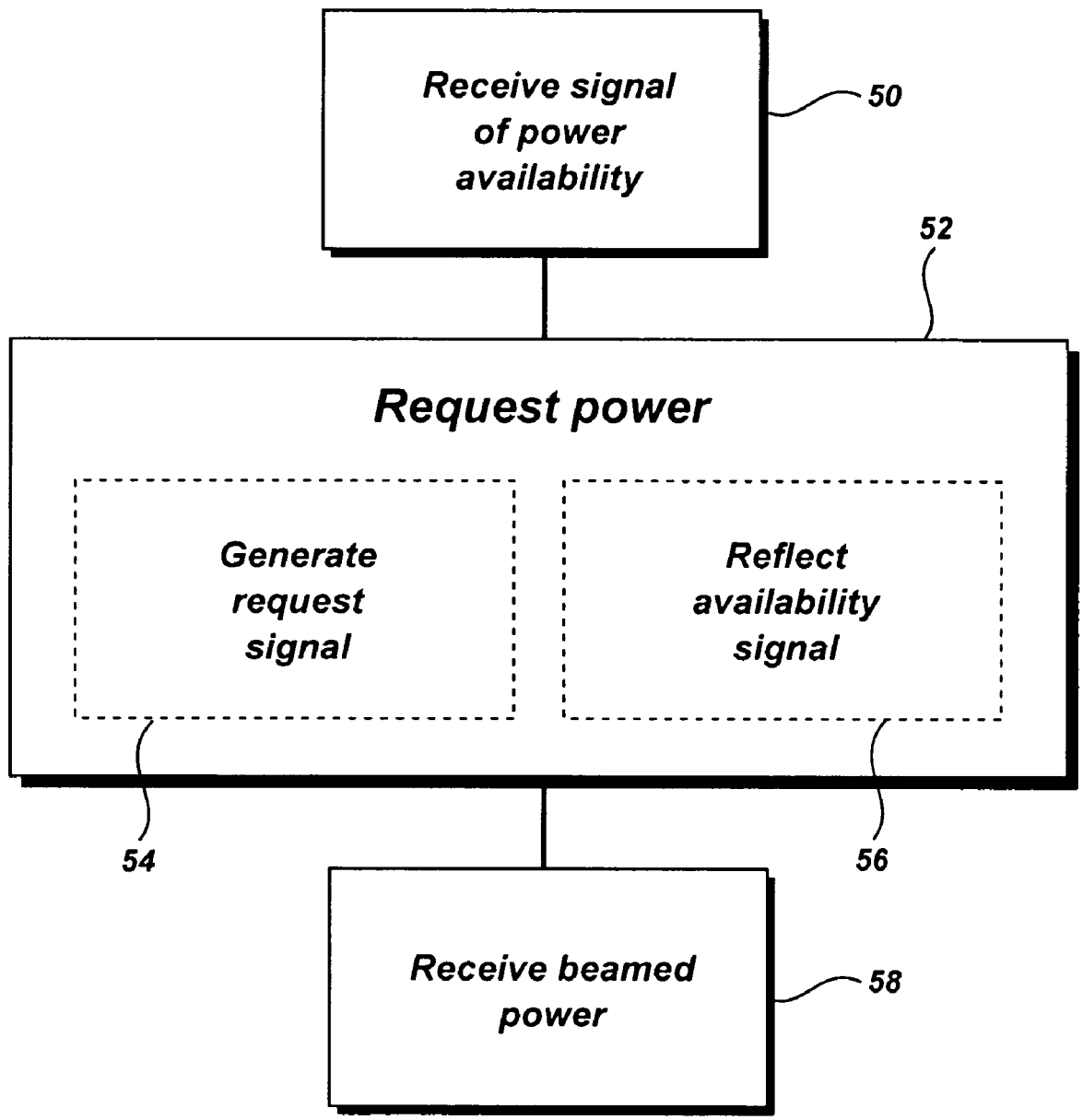
FIG. 3 is a flow chart illustrating operation of a power receiver.

FIG. 3 is a flow chart illustrating operation of a power receiver such as power receiver 20 of FIG. 1. As shown in step 50, power receiver 20 receives a broadcast signal indicating availability of power (e.g., from power source 10) via signal receiver 22. As shown in step 52, power receiver 20 then transmits a request for power via transmission unit 24. In some embodiments, transmission unit 24 may include a transmitter that generates and transmits a request signal, as shown in step 54. Additionally or alternatively, transmission unit 24 may include a retroreflector or similar apparatus that reflects the broadcast signal back to power source 10 to indicate the presence of power receiver 20, as shown in step 56. In some embodiments, this "reflection" may be accomplished by passive reflection, or it may encompass modulation or powered retransmission of the original signal (e.g., by use of a transponder). The request signal may include location information for power receiver 20, either explicitly (e.g., in the form of an encoded signal) or implicitly (e.g., the location may be determinable from the direction of the received signal, for example because power receiving unit 26 is known to be coterminous with transmission unit 24 or to have a known offset therefrom).

The request signal may include information describing power needs of power receiver 20, such as beamed power parameters (e.g., power type, wavelength, pulse characteristics, power amount, energy amount, polarization, power-vs.-time profile, time window, offset of aperture site from receiving unit signal location, aperture size of receiving unit, or attitude of aperture of receiving unit) or economic parameters (e.g., acceptable price, ability to pay, mode of payment, or identifying information for the receiving unit). These parameters may be explicitly transmitted, or they may be determinable by location unit 14 on the basis of identifying information for the power receiver 20.

As shown in step 58, power receiver 20 receives beamed power in response to the request via power receiving unit 26.

Figure 4:
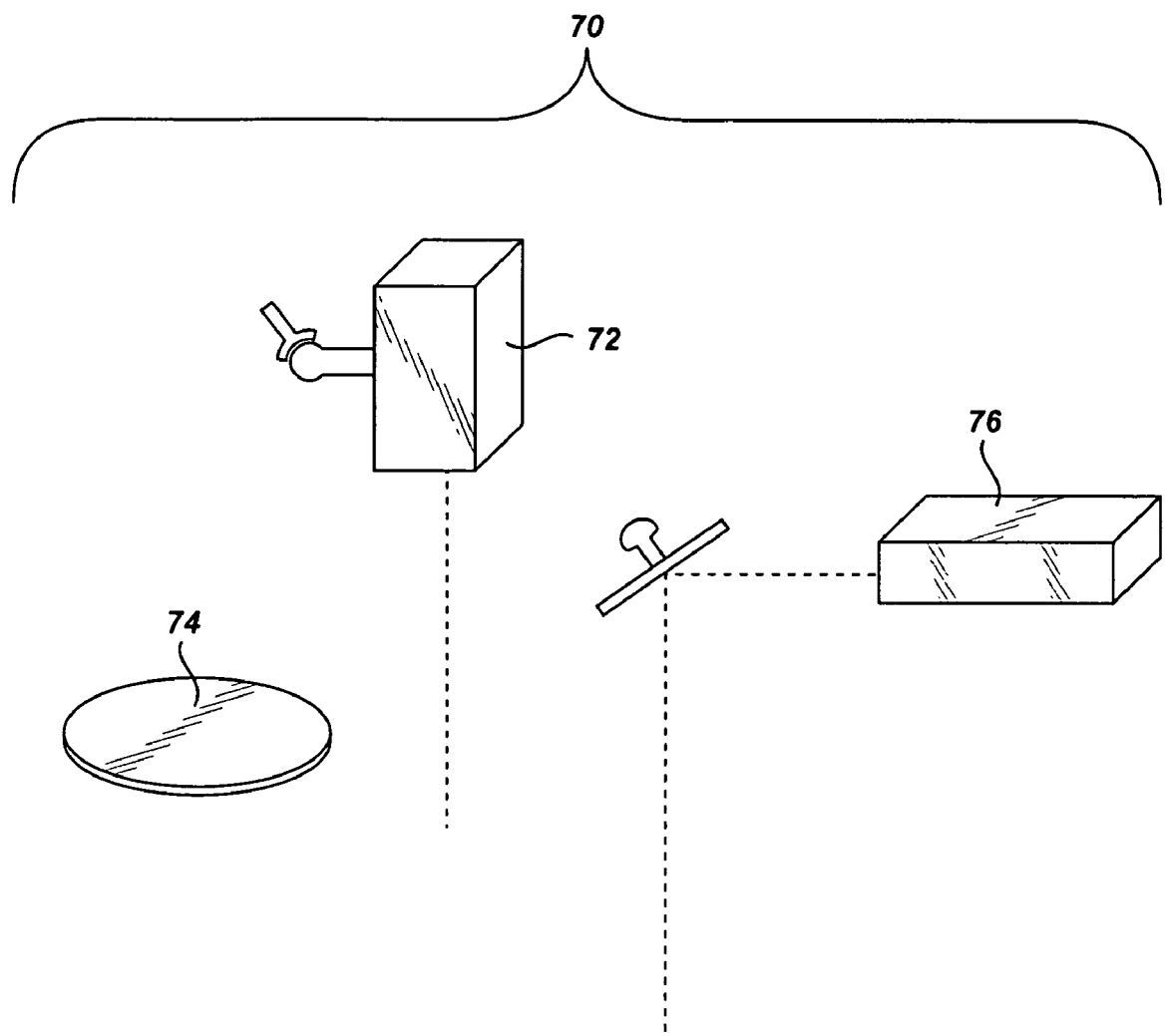
FIG. 4 is a schematic of a power source.

FIG. 4 illustrates a power source configured to scan a signal advertising power availability. The illustrated embodiment includes a location unit 70, including a transmitter 72 configured to scan a narrow-beam signal (e.g., a focused signal) through a space (e.g., an enclosed space such as a room), and a receiver 74 configured to receive a request for power in the form of a reflection of the signal, and a power beaming unit 76 configured to beam power in response to the request. Transmitter 72 may be configured to transmit an electromagnetic signal (e.g., an optical or RF signal) or an acoustic signal, and may be configured to move the beam source to scan the area (as shown in FIG. 4), or may include an adjustable beam-directing element such as a mirror to scan the beam. The unit may scan continuously, on a time schedule, or in response to a detected condition. For example, the unit may detect (or receive information detected by another device) indicating that a person has entered the room, and may then initiate a scan for devices that may be in need of power (e.g., devices carried by the entering person).

In some embodiments, the received reflected signal may be modulated, and location unit 70 may be configured to interpret the modulation, for example in order to receive data about the reflecting power receiver such as its location, attitude, or identifying information. Location unit 70 may also be configured to determine location, attitude, or other attributes using the signal path from the receiving unit, or by using identifying information provided by the receiving unit, for example to determine a previous location for the same unit or to access a database of known receiving unit locations. The received reflected signal may be modulated by the receiving unit or by another element in the signaling path such as a beam-directing element. The receiving unit may also communicate with the power beaming unit via another channel, such as an electromagnetic or acoustic transmission, a wired channel, or via the internet, in addition to reflecting the received signal.

The power unit of FIG. 4 may further include a decision unit (not shown), which may be configured to determine whether or how to beam power from the power unit in response to a request, as described herein in connection with FIG. 1.

In some embodiments, location unit 70 may be configured to transmit data to the receiving unit, for example via transmitter 72, by modulating the beam power of power beaming unit 76, or via a separate channel (not shown) such as another transmitter or another communications channel such as an internet connection. For example, location unit 20 may be configured to negotiate power delivery or payment characteristics, to authenticate identity of the receiving unit, or to monitor receipt of power by the receiving unit.

Figure 5:
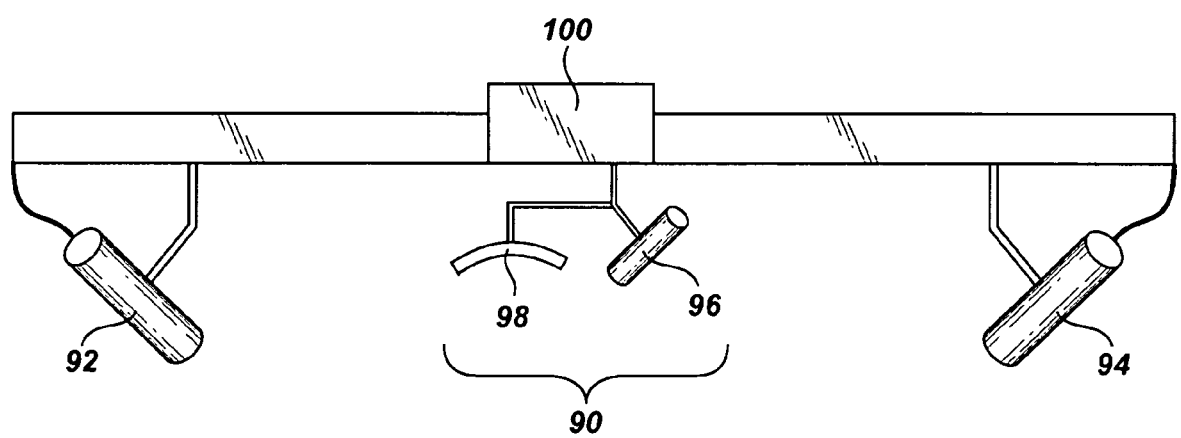
FIG. 5 is a schematic of a power beaming system including multiple power beaming units.

FIG. 5 is a schematic illustrating a system for supplying beamed power to a receiving unit including a location unit 90 and a plurality of power beaming units 92, 94. While the illustrated embodiment includes two power beaming units, more may be included according to power requirements, space limitations, and other design constraints. Power beaming units 92, 94 need not be identical. Location unit 90 includes a broadcast transmitter 96 and a receiver 98. As shown, location unit 90 is offset from power beaming units 92, 94, but location unit 90 may also be colocated with one or more of the plurality of power beaming units. In some embodiments, there may further be additional location units (not shown). The illustrated system further includes an optional decision unit 100 which is connected to power beaming units 92, 94. Decision unit 100 is configured to accept location information from location unit(s) 90 and to designate one or more of power beaming units 92, 94 to beam power to a receiving unit in response to a request. The system may be configured to beam power either to a single requesting power receiver (from one or multiple sources) or to a plurality of receivers.

Decision unit 100 may use any of a variety of inputs to determine which power beaming unit(s) will supply power to a given receiver, including physical proximity, unobstructed power beam length, requested power characteristics (e.g., type, wavelength, pulse characteristics, quantity, polarization, power-vs-time profile, or time window), transaction characteristics (e.g., acceptable price, ability to pay, mode of payment, or identifying information for a receiving unit), or historical information (e.g., historical frequency of interruption of a given beam path). For example, decision unit 100 may determine that one power beaming unit is better suited to supply power at a requested frequency, and may direct that power beaming unit to beam power to the requesting receiving unit. In some embodiments, it may determine which power beaming unit has the shortest optical path length to the receiving unit (taking into account any beam-directing elements such as mirrors that may be interposed between the power beaming unit and the receiver), and may select the power beaming unit having the shorted unobstructed beam path to the receiver (which may or may not be the power beaming unit in closest physical proximity to the receiver), or it may select the power beaming unit having the highest projected power intensity for the receiver location, taking into account angle of arrival of the power beam. In some embodiments, decision unit 100 may use a multipoint optimization algorithm, for example one designed to ensure best overall power delivery according to a selected figure-of-merit even if no single receiver receives power from the "best" source or vice versa. Decision unit 100 may further include circuitry for determining whether to initiate, suspend, or terminate power beaming for any or all power beaming units, for example in response to changing geometrical or economic conditions.

Receiver 98 may be configured to receive a request for power in the form of a transmission from a receiving unit or in the form of a reflection of the broadcast signal from the receiving unit, which may be a modulated reflection, as described elsewhere herein. The request for power may include location information for the receiving unit, either explicitly in a received signal or implicitly (e.g., by inference from a beam path or by identification of the requesting receiving unit). The system may include a plurality of receivers 98 or of broadcast transmitters 96, for example to provide uniform coverage throughout an enclosed space containing obstacles.

Power beaming units 92, 94 may be configured to beam power to a plurality of power receivers. In some embodiments, each power beaming unit may beam power to a single receiver, while in other embodiments, one power beaming unit may serve multiple receivers, or multiple power beaming units may serve a single receiver. For example, a power beaming unit may be configured to split an output beam (e.g., via a beam splitter or spatial divider) and to direct each portion of the split beam to a different power receiver, or the power beaming unit may be configured to beam power to different power receivers serially, for example by scanning a beam to each power receiver in turn. The system may determine (e.g., using decision unit 100) relative priority of different power receivers for power to determine how to split or scan a beam from a power receiver.

In some embodiments, power beaming units 92, 94 may share a common energy source. For example, a single laser or other electromagnetic beam source (not shown) may illuminate a plurality of optical fibers or other energy conduits that "pipe" energy to power beaming units 92, 94 for transmission from physically separated points.

Figure 6:
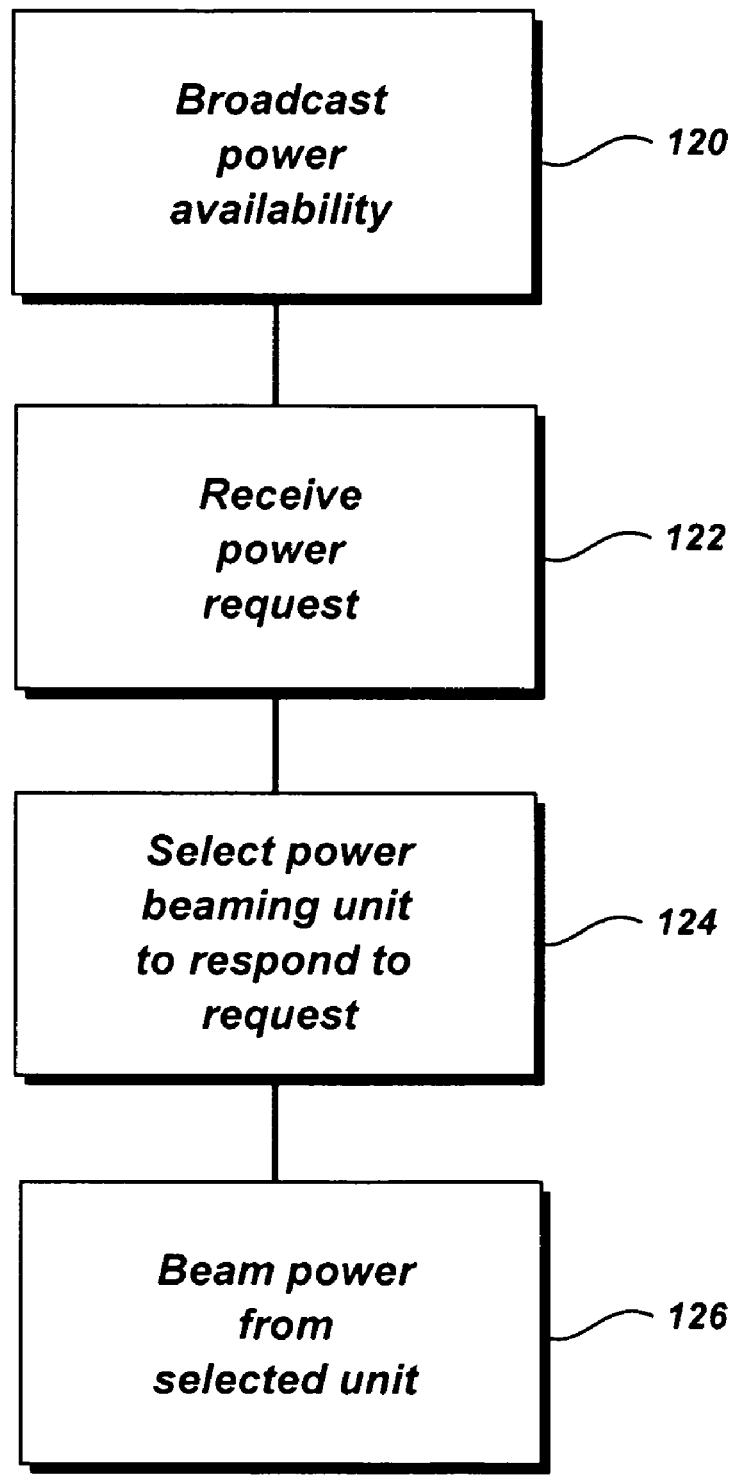
FIG. 6 is a flow chart illustrating operation of a power source including multiple power beaming units.

FIG. 6 is a flow chart illustrating operation of a system including multiple power beaming units such as the system illustrated in FIG. 5. As shown in step 120, broadcast transmitter 96 broadcasts a signal indicating power availability. In some embodiments, this broadcast may be in response to a triggering unit (not shown), which may signal broadcast transmitter 96 to broadcast in response to a condition such as a person entering the room, or in response to receipt of a signal such as an internet transmission or a request from the receiving unit. In response to the broadcast, receiver 98 receives a request for power from a receiving unit as shown in step 122. As discussed above, this request may be in the form of a direct transmission, or it may be a reflection (optionally modulated) of the broadcast signal. As shown in step 124, the system selects one or more power beaming units 92, 94 to respond to the request (e.g., by operation of a decision unit 100), and beams power from the selected unit(s) as shown in step 126. In some embodiments, receiver 98 may identify preferred power beaming unit(s) and communicate a request for power from one or more specific units.

Figure 7:
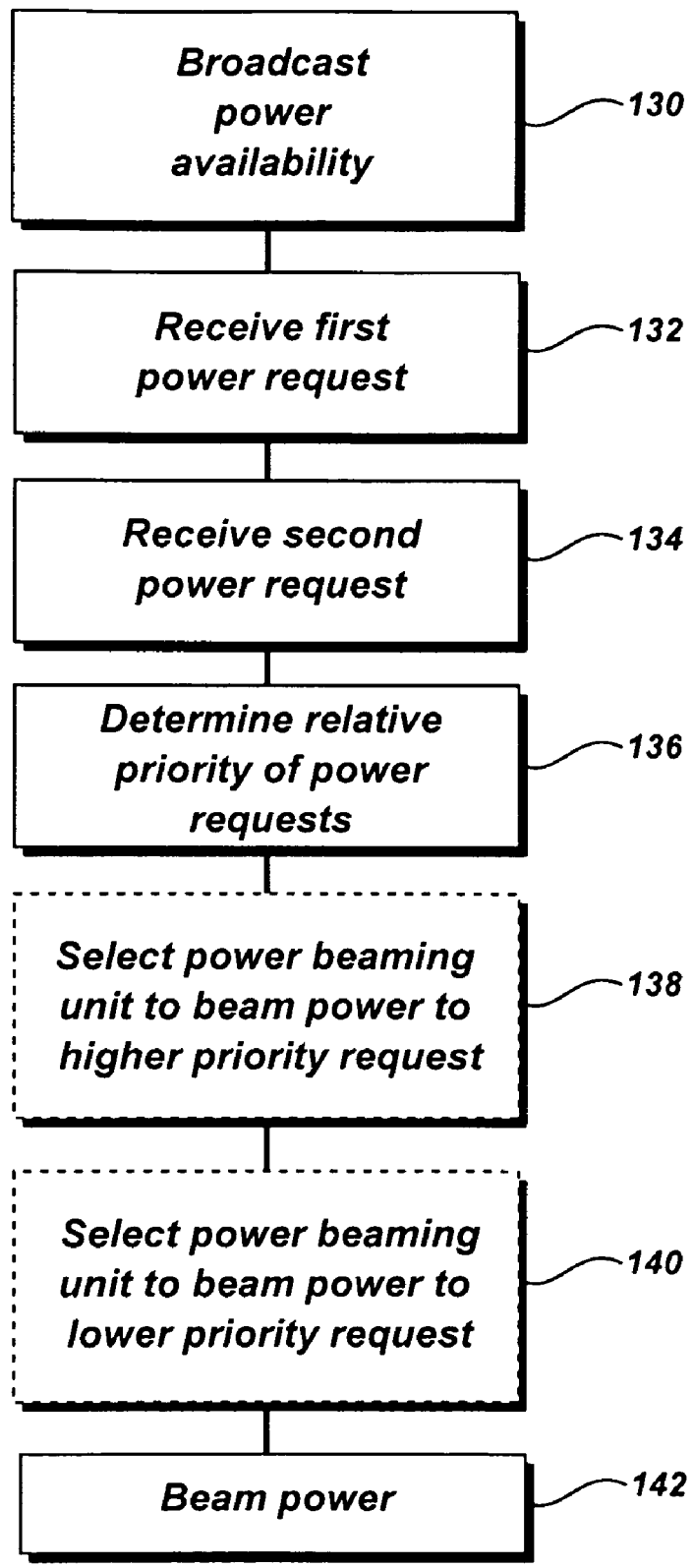
FIG. 7 is a flow chart illustrating operation of a power source serving multiple power receiving units.

FIG. 7 is a flow chart illustrating operation of a system supplying beamed power to multiple receiving units. The system may include a single power beaming unit as shown in FIG. 1, or multiple power beaming units as shown in FIG. 5. As shown in step 130, the system broadcasts a signal indicating power availability. The system receives a first power request and a second power request in response to the broadcast, as shown in steps 132 and 134 respectively. The system then determines (e.g., by operation of a decision unit) relative priority of the power requests, as shown in step 136. For example, the system may select the power request which generates maximum revenue or profit, or it may select the power request that may be most efficiently served by the system, or it may select a power request by any other suitable criterion. The selection criterion may include reference to data supplied by one or both requesting receiving units, such as power type, wavelength, pulse characteristics, power amount, polarization, power-vs-time profile, time window, acceptable price, ability to pay, mode of payment, or identifying information for the receiving unit(s). As shown in steps 138 and 140, the system then selects a power beaming unit to beam power to the higher priority requester (if the system includes multiple power beaming units), and further may select a power beaming unit to beam power to the lower priority requester. These power beams may originate from the same or separate power beaming units, and in some embodiments, more than one power beaming unit may supply power to the same receiver. As shown in step 142, the system beams power from the selected power beaming units to the requesting receiving unit(s).

Figure 8:
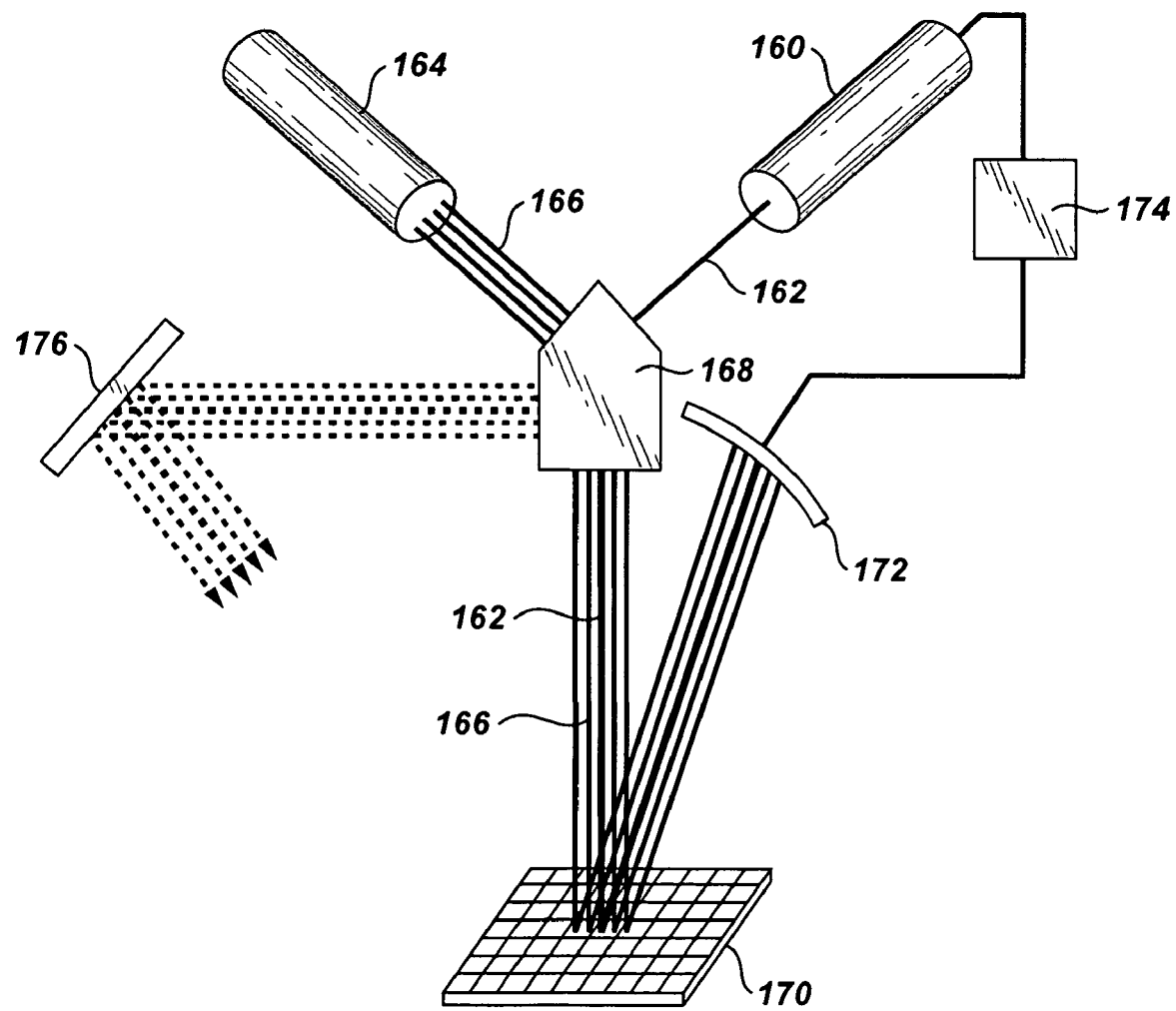
FIG. 8 is a schematic of a power beaming system including a guard beaming unit with a monitor at the power beaming side.

FIG. 8 is a schematic of a power beaming system that delivers a power beam substantially surrounded by a guard beam. Power beaming unit 160 is configured to supply power in the form of power beam 162 (e.g., a laser beam), and guard beaming unit 164 is configured to produce a guard beam 166. In the illustrated embodiment, these beams are combined in beam combiner 168 to be substantially collinear. The broader guard beam 166 thus surrounds (and optionally overlaps) the narrower power beam 162. Beam combiner 168 may be omitted if power beaming unit 160 and guard beaming unit 164 are configured to produce the desired beam geometry. For example, guard beaming unit 164 may include multiple guard beam generators arranged around power beaming unit 160 to produce overlapping or non-overlapping guard beams 166 that collectively surround power beam 162.

The combined beam is directed to power receiver 170, where at least a portion of the beam is reflected back to guard beam receiver 172. In some embodiments, power receiver 170 may be configured to absorb a substantially greater fraction of power from power beam 162 than from guard beam 166, reflecting a substantially greater fraction of power from guard beam 166 (for example, guard beam 166 may be at a nonabsorbed frequency for receiver 170 as compared to power beam 162). For clarity in the illustrated embodiment, the reflected path is somewhat angled from the beam path, but the reflection may also be close to the original beam path, for example by use of a retroreflector at the power receiver 170, or may be at any selected angle calculated to reach guard beam receiver 172.

Power beam 162 will typically (but not necessarily) have a higher power density than guard beam 166. In addition, the beams may (but need not) differ in wavelength, polarity, modulation, or character (e.g., an electromagnetic power beam and an acoustic guard beam). If the beams differ in any of these characteristics, the differing characteristic(s) may be used to differentiate impingement on guard beam 166 from impingement on power beam 162 as further discussed in connection with FIG. 10 and FIG. 11. In addition, guard beam 166 need not be homogeneous, and the location of the impingement may be inferred from the characteristics of the reflected signal. For example, guard beam 166 may comprise a plurality of beams of different frequency arranged around power beam 162. By monitoring which frequency or frequencies are interrupted, one or more characteristics of the impinging object may be inferred, such as speed, direction, size, shape, or composition. This information may be used, for example, to predict when the object will leave the beam path and allow resumption of power beam 162. Similarly, guard beam 166 may be a relatively narrow beam rapidly scanned around power beam 162 (or a series of narrow guard beams surrounding power beam 162 which are illuminated in series), rather than a wide beam continuously surrounding power beam 162 as illustrated in FIG. 8. In such embodiments, characteristic(s) of the impinging object may be determined by monitoring the temporal profile of guard beam intensity. Guard beam 166 may also include a plurality of substantially concentric guard beams. In some such embodiments, impingement on an outer guard beam may warn power beaming unit 160 to prepare to suspend transmission, and transmission may be suspended or terminated if an inner guard beam is also impinged.

Guard beam receiver 172 monitors the reflected guard beam 166. If the amount of energy received from guard beam 166 changes character in a way indicating a possible impingement on the beam (e.g., beam power drops), decision circuitry 174 may direct power beaming unit 160 to suspend or terminate transmission of power beam 162. Because guard beam 166 substantially surrounds power beam 162, power can be cut off in response to impingement of the guard beam before an object or person intersects the power beam and possibly suffers damage. Alternatively, instead of suspending transmission of power beam 162, the system may reroute the power beam to avoid the impinging object. For example, in the illustrated embodiment, beam combiner 168 may direct the combined beam to a beam-directing element 176 (in the embodiment illustrated, a mirror), which redirects the combined beam toward power receiver 170. In some embodiments, there may be a plurality of guard beam receivers (not shown). Additionally or alternatively, reflected guard beam 166 may also be used to monitor quality of power transmission. For example, if guard beam 166 is being reflected on only one side, it may indicate that power beam 162 is not targeted directly at power receiver 170, or that the shape of the beam spot should be adjusted to match the apparent shape of power receiver 170 (which may change depending on receiver attitude).

In some embodiments, the cylindrical geometry of reflected guard beam 166 may be generated by a retroreflector. For example, a noncollimated light source at power beaming unit 160 may be reflected back to the unit by a retroreflector array (e.g., 3M Scotchlite™). A retroreflector array surrounding a main power receiver target may also reflect back fringes of power beam 162 to act as reflected guard beam 166. In some embodiments, a retroreflector at the power receiver may have a distinguishable spatial structure that allows inference of characteristics or geometry of an impinging object.

Figure 9:
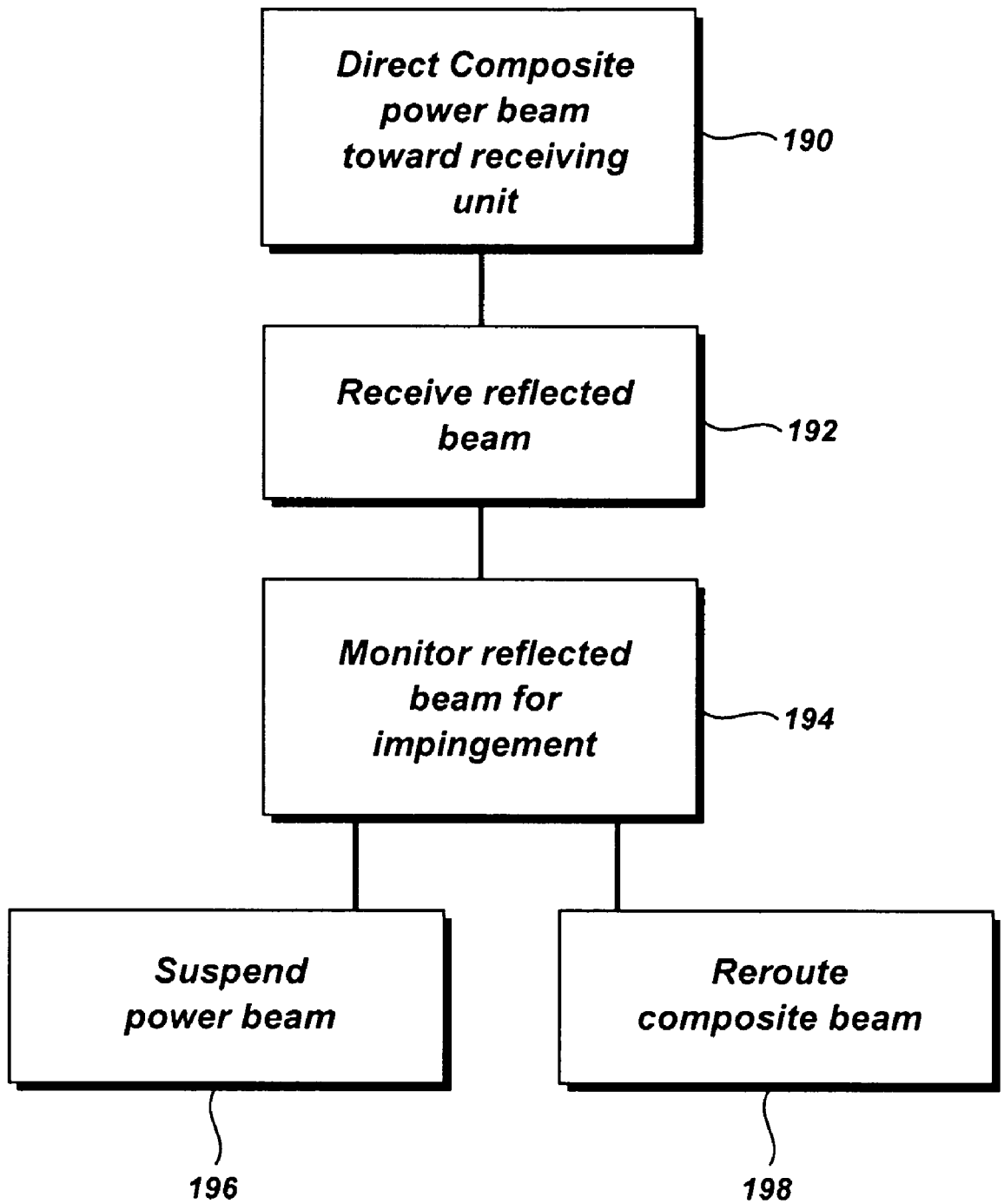
FIG. 9 is a flow chart illustrating operation of a power beaming system including a guard beam monitor at the power beaming side.

FIG. 9 is a flow chart illustrating a method of supplying beamed power, for example using a system such as that shown in FIG. 8. As shown in step 190, the method includes directing a composite beam toward a receiving unit, where the composite beam includes a power beam 162 and a guard beam 166 substantially surrounding the power beam. As shown in step 192, a reflection of the composite beam is received from the receiving unit, the reflection including at least a portion of the guard beam 166. The method includes monitoring the received reflection to identify an impingement on the guard beam 166, as shown in step 194. Finally, the method may include either suspending at least the power beam 162 as shown in step 196, or rerouting the composite beam as shown in step 198. In some embodiments, upon starting or rerouting the composite beam, the system may first transmit only a guard beam while checking to confirm that an unobstructed beam path is available for power transmission.

Figure 10:
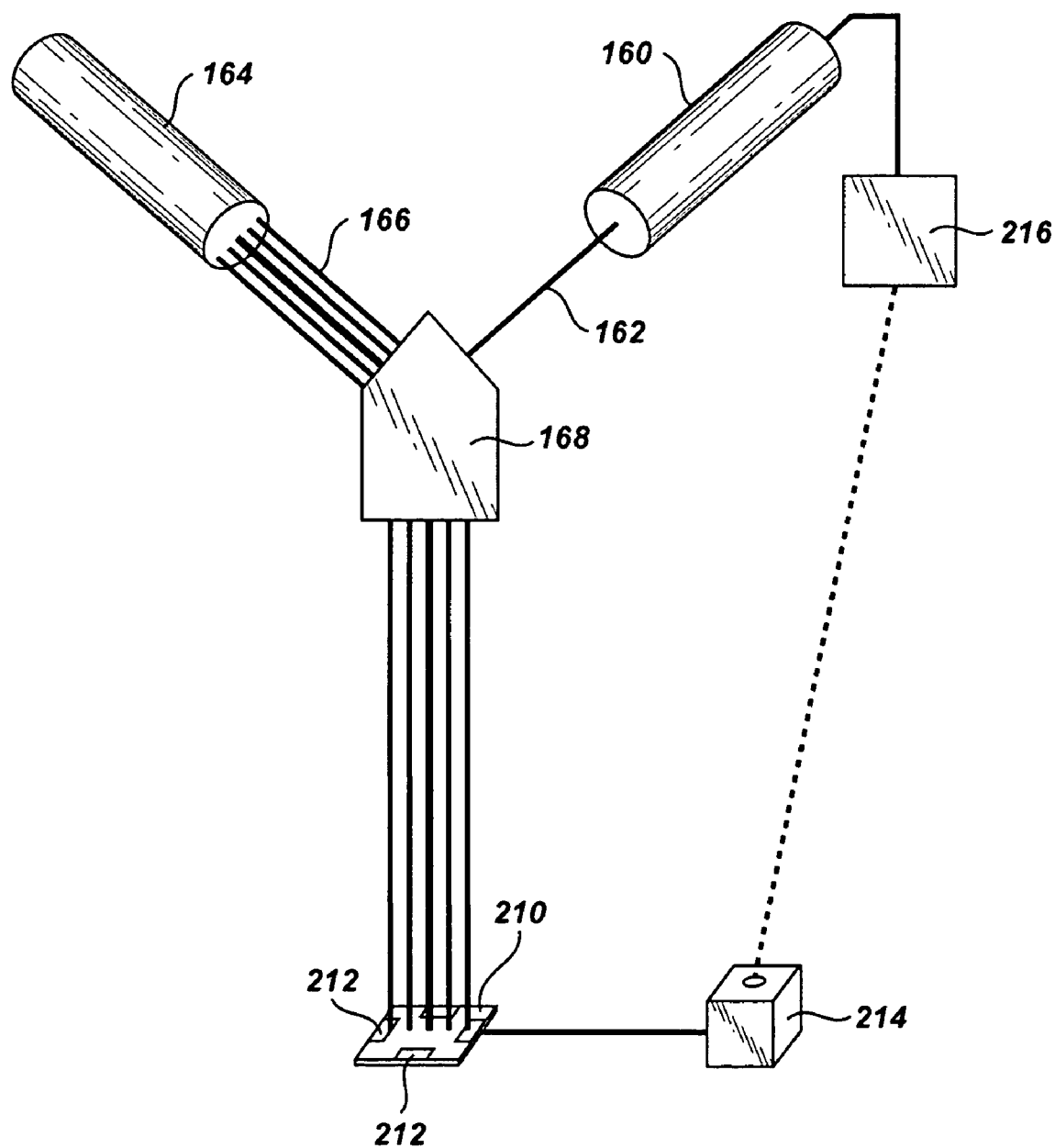
FIG. 10 is a schematic of a power beaming system including a guard beaming unit with a monitor at the power receiver side.

FIG. 10 is a schematic of another power beaming system including a power beaming unit 160, a guard beaming unit 164, and a beam combiner 168. The guard beam 166 differs from the power beam 162 in modulation or polarization. After exiting beam combiner 168, guard beam 166 and power beam 162 are received at power receiver 210, which is configured to differentiate between guard beam 166 and power beam 162 by tracking their differing characteristics such as modulation or polarization. In the illustrated embodiment, sensors 212 are arranged to monitor guard beam 166, while the main body of receiver 210 converts power beam 162 into electrical energy to power a device (e.g., a laptop computer), but separate sensors may not be required in all embodiments. If power receiver 210 detects that guard beam 166 has been at least partially interrupted by an impinging object which may intersect power beam 162, it directs transmitter 214 to communicate with beam interruption unit 216. Upon receipt of a communication (including a possible cessation of communication as discussed hereinafter) from transmitter 214 indicating impingement, beam interruption unit 216 directs power beaming unit 160 to suspend or reroute the beam. In some embodiments, a "fail safe" configuration for transmitter 214 may be used, in which transmitter continuously transmits to beam interruption unit 216 until an impingement occurs. If beam interruption unit 216 fails to detect a signal from transmitter 214, it directs power beaming unit 160 to suspend, reroute, or terminate power beam 162. As discussed in connection with FIG. 8, if guard beam 166 is not homogenous, receiver 210 may also infer a location or direction of motion of the impinging object, and this information may be conveyed to beam interruption unit 216.

Figure 11:
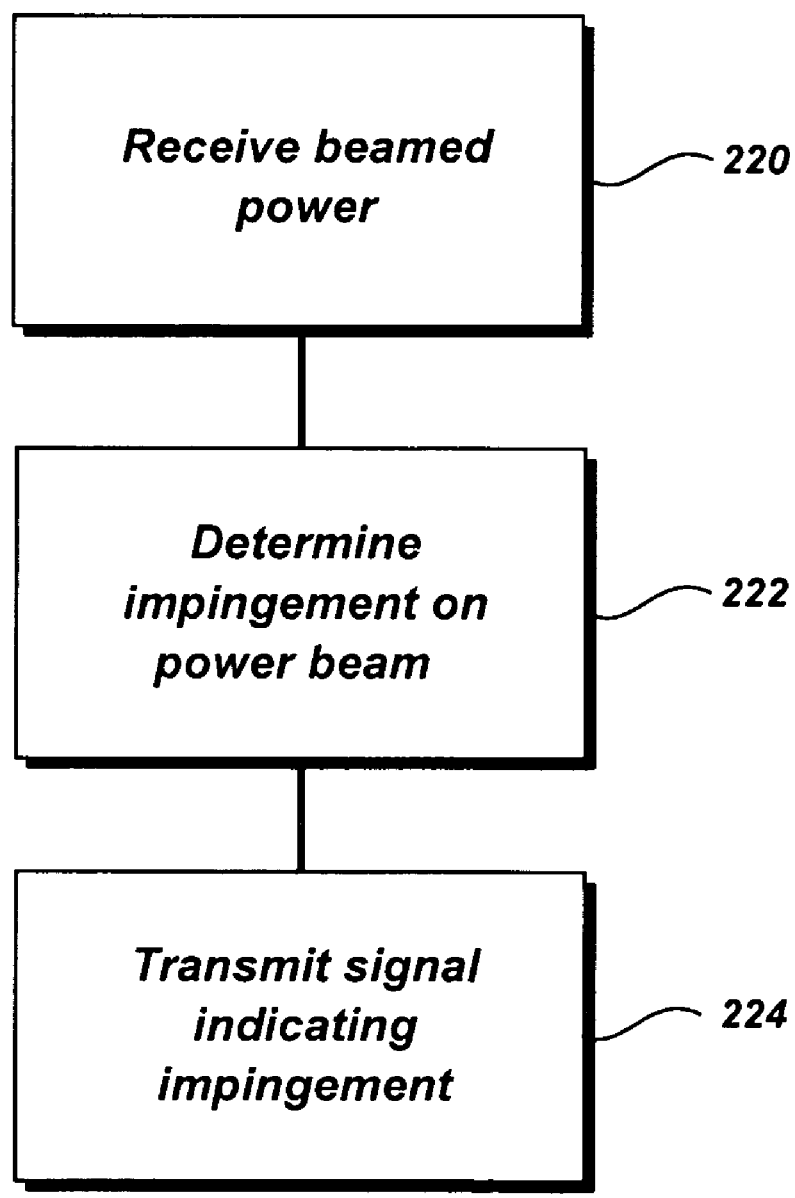
FIG. 11 is a flow chart illustrating operation of a power beaming system including a guard beam monitor at the power receiver side.

FIG. 11 is a flow chart illustrating a method of preventing impingement on a power beam. As shown in step 220, the method includes receiving beamed power from a power source. The beamed power includes a guard beam substantially surrounding a power beam and differing therefrom in modulation or polarization. As shown in step 222, the method includes determining that an object has impinged upon the guard beam, and as shown in step 224, transmitting a signal to the power source to indicate impingement on the guard beam. Impingement on the guard beam may be determined by recognizing the modulation or polarization of the guard beam that differs from that of the power beam. In some embodiments, determining that an object has impinged may include determining information about the impinging object (e.g., location, speed, or optical properties), and transmitting a signal may include transmitting the determined information.

Figure 12:
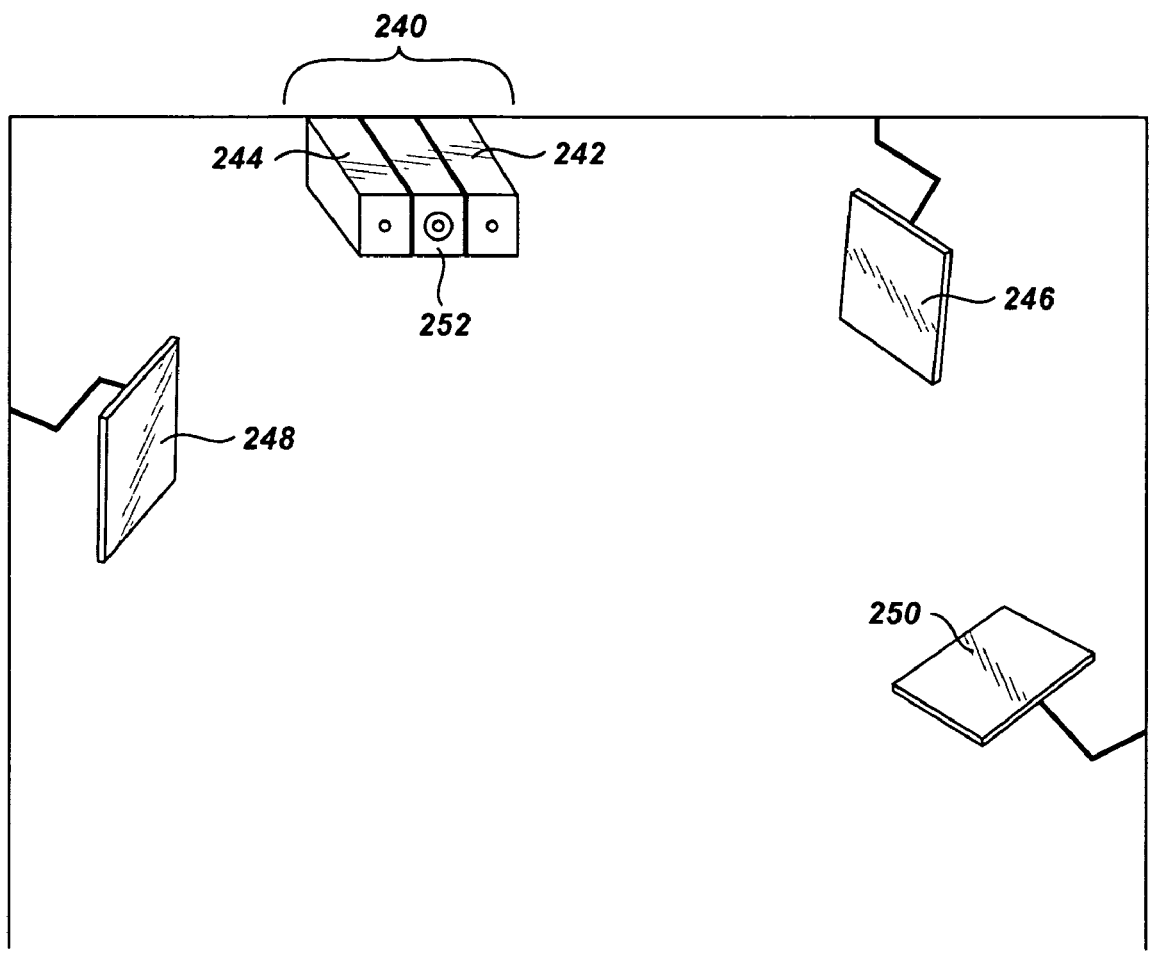
FIG. 12 is a schematic of a power beaming system configured to use beam-directing mechanisms to direct a power beam to a receiver.

FIG. 12 is a schematic illustrating a power beaming system configured to access one or more beam-directing mechanisms (e.g., relays). The system includes a location unit 240 including a transmitter 242 configured to broadcast a beam indicative of the system's ability to supply power and a receiver 244 configured to receive a request for power from a receiving unit. The system further includes at least one beam-directing mechanism 246 configured to change direction of a power beam. In the illustrated embodiment, the beam-directing mechanism 246 is a turning mirror, but beam-directing mechanisms need not be mobile. In some embodiments, a combination of fixed and turning mirrors may be used, or fine beam adjustments may be geometrically magnified by the use of curved mirrors or analogous systems. The illustrated embodiment further includes optional additional turning mirrors 248 and 250. The system further includes a power beaming unit 252 remote from the beam-directing mechanism(s) that is configured to beam power to a receiving unit via the beam-directing mechanism(s). In embodiments including multiple beam-directing mechanism, the beam may be directed by one or more of the beam-directing mechanisms. In the illustrated embodiment, location unit 240 is colocated with power beaming unit 252, but it may also be colocated with a beam-directing mechanism or freestanding.

In some embodiments, the power beaming unit may be configured to dynamically locate the beam-directing mechanism(s), for example by scanning a low-power search beam to search for reflections or by broadcasting a signal requesting acknowledgement from beam-directing mechanisms configured to work with the power beaming unit. Alternatively, the location unit may be configured to locate beam-directing mechanism(s) and to communicate their locations to the power beaming unit.

In embodiments in which the beam-directing mechanism is adjustable (e.g., the turning mirrors illustrated in FIG. 12), the beam-directing mechanism may be configured to dynamically adjust the direction of the power beam to follow a moving power receiver as it moves. The beam-directing mechanism may be configured to monitor the position of the power receiver (e.g., optically), or to receive information about the location of the power receiver from the power receiver (e.g., via a wireless connection).

Figure 13:
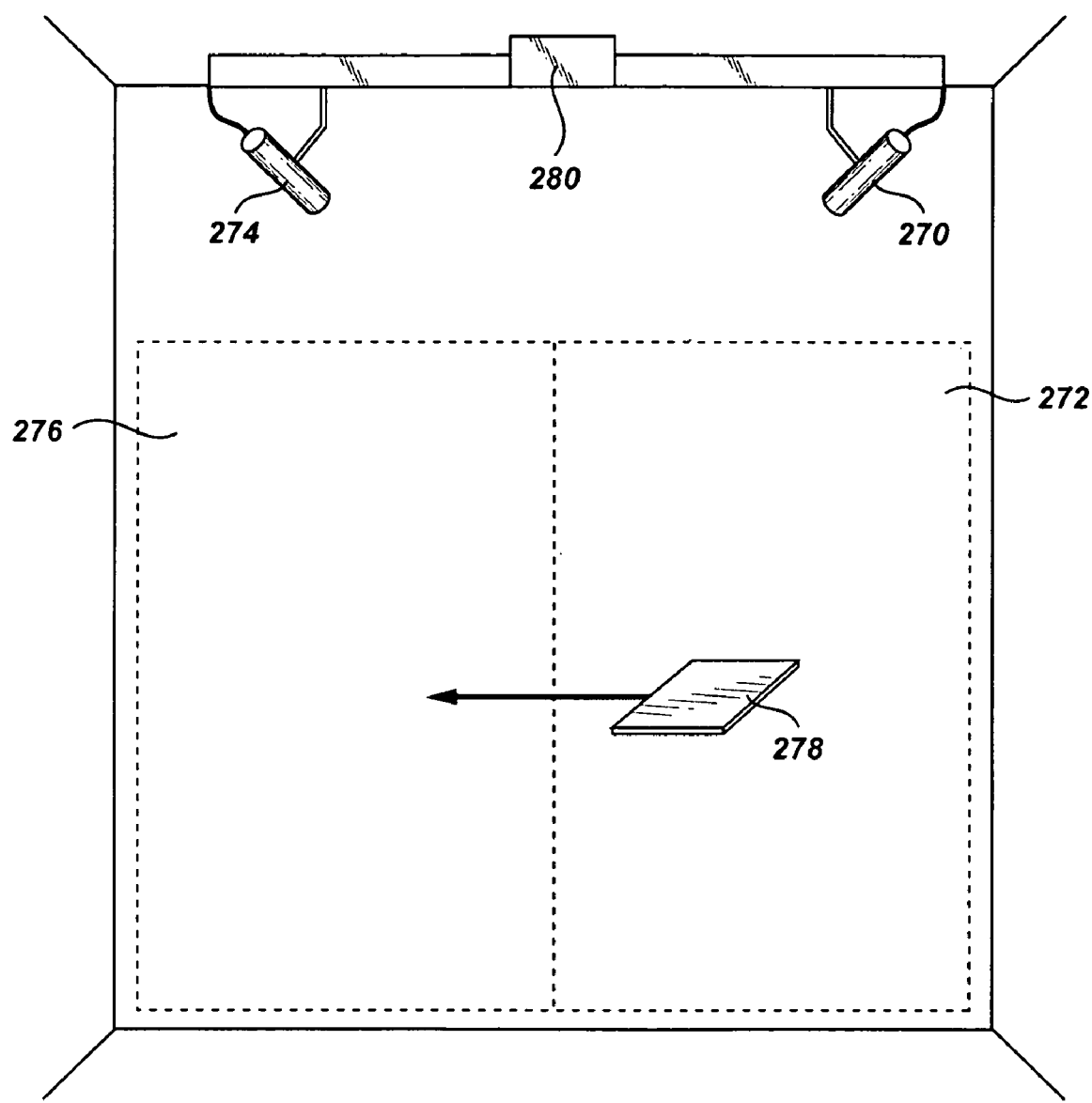
FIG. 13 is a schematic of a power beaming system configured to hand off power beaming from one unit to another as a receiver moves between power zones.

FIG. 13 is a schematic of a system including multiple power zones. First power beaming unit 270 is configured to beam power to a receiver in first power zone 272, and second power beaming unit 274 is configured to beam power to a receiver in second power zone 276. The system is configured to determine the position of power receiver 278 within the room, so that first power beaming unit 270 beams power to it while it is in first power zone 272. As it moves from first power zone 272 to second power zone 276, first power beaming unit 270 discontinues power transmission and second power beaming unit 274 initiates power transmission. The system may further include a decision unit 280 configured to determine the location of power receiver 278 and to direct power beaming units 270, 274 to initiate or terminate power beaming as receiver 278 moves to and from their respective power zones.

Determining the location of power receiver 278 may simply include determining which zone holds the power receiver, or it may include determining the power receiver's position within the zone. Position may be determined by a variety of methods, including scanning, imaging, communication with the power receiver, or monitoring of traffic across power zone borders.

Various embodiments of power beaming units, receivers, and associated methods have been described herein. In general, features that have been described in connection with one particular embodiment may be used in other embodiments, unless context dictates otherwise. For example, the guard beam systems described in connection with FIG. 8 may be employed in any of the embodiments described herein. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a receiver" should typically be interpreted to mean "at least one receiver"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two power beaming units," or "a plurality of power beaming units," without other modifiers, typically means at least two power beaming units). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for supplying beamed power to a receiving unit, comprising:
a location unit configured to locate a target receiving unit in need of power by
broadcasting a signal indicative of the system's ability to supply power; and
receiving a request for power from the receiving unit in response to the broadcast signal; and
a plurality of power beaming units, each configured to beam power to a receiving unit.

2. The system of claim 1, wherein the location unit is colocated with one of the plurality of power beaming units.

3. The system of claim 1, wherein the system includes a plurality of location units.

4. The system of claim 3, wherein each power beaming unit is colocated with a member of the plurality of location units.

5. The system of claim 1, further comprising a decision unit configured to designate a member of the plurality of power beaming units to beam power to a receiving unit in response to a request therefrom.

6. The system of claim 5, wherein the decision unit is configured to designate the member of the plurality of power beaming units in closest physical proximity to the requesting receiving unit.

7. The system of claim 5, wherein the decision unit is configured to determine an unobstructed power beam path length from each member of the plurality of power beaming units to the requesting receiving unit, and to designate the member of the plurality of power beaming units having the shortest unobstructed power beam path length.

8. The system of claim 5, wherein the decision unit is configured to designate a member of the plurality of power beaming units having the highest projected power intensity.

9. The system of claim 5, wherein the decision unit is configured to designate a member of the plurality of power beaming units having a power characteristic corresponding to a characteristic requested by the receiving unit.

10. The system of claim 9, wherein the power characteristic is selected from the group consisting of power type, wavelength, pulse characteristics, power amount, polarization, power-vs-time profile, and time window.

11. The system of claim 5, wherein the decision unit is configured to designate a member of the plurality of power beaming units having a transaction characteristic corresponding to a characteristic requested by the receiving unit.

12. The system of claim 11, wherein the transaction characteristic is selected from the group consisting of acceptable price, ability to pay, mode of payment, and identifying information for the receiving unit.

13. The system of claim 5, wherein the decision unit is configured to determine whether to initiate power beaming.

14. The system of claim 5, wherein the decision unit is configured to determine whether to suspend power beaming.

15. The system of claim 5, wherein the decision unit is configured to determine whether to terminate power beaming.

16. The system of claim 1, wherein the location unit is configured to receive a request for power in the form of a transmission from the receiving unit.

17. The system of claim 1, wherein the location unit is configured to receive a request for power in the form of a reflection of the broadcast signal from the receiving unit.

18. The system of claim 1, wherein the request for power from the receiving unit includes location information for the receiving unit.

19. The system of claim 18, wherein the location information for the receiving unit is encoded in a signal received from the receiving unit.

20. The system of claim 18, wherein the location information for the receiving unit is determinable from a path of a signal received from the receiving unit.

21. The system of claim 20, wherein the location unit is configured to determine the path of the received signal by scanning.

22. The system of claim 20, wherein the location unit is configured to determine the path of the received signal by imaging.

23. The system of claim 1, wherein the location unit is configured to broadcast an electromagnetic signal.

24. The system of claim 1, wherein the location unit is configured to broadcast an acoustic signal.

25. The system of claim 1, wherein the location unit is configured to receive a request for power including information describing power needs.

26. The system of claim 25, wherein the information describing power needs includes at least one datum selected from the group consisting of power type, wavelength, pulse characteristics, power amount, polarization, power-vs-time profile, and time window.

27. The system of claim 25, wherein the information describing power needs includes at least one datum selected from the group consisting of acceptable price, ability to pay, mode of payment, and identifying information for the receiving unit.

28. The system of claim 1, wherein the location unit is configured to exchange data with the receiving unit.

29. The system of claim 28, wherein the location unit is configured to transmit data to the receiving unit by modulating the beamed power from a member of the plurality of power beaming units.

30. The system of claim 28, wherein the location unit is configured to transmit data to the receiving unit via a separate channel from the beamed power from a member of the plurality of power beaming units.

31. The system of claim 1, wherein at least a subset of the plurality of power beaming units is configured to beam power directly to the receiving unit.

32. The system of claim 1, wherein at least a subset of the plurality of power beaming units is configured to beam power to a beam-directing element configured to redirect the power to the receiving unit.

33. The system of claim 1, wherein at least a subset of the plurality of power beaming units is configured to gradually increase an amount of power beamed from the power beaming unit.

34. The system of claim 1, wherein at least a subset of the plurality of power beaming units is configured to beam electromagnetic power.

35. The system of claim 34, wherein the electromagnetic power has an optical frequency.

36. The system of claim 34, wherein the electromagnetic power has a radio frequency.

* * * * *